(12) United States Patent
Vandeven et al.

(10) Patent No.: US 11,064,654 B2
(45) Date of Patent: Jul. 20, 2021

(54) FLOAT ADJUSTMENT

(71) Applicant: DEERE & COMPANY, Moline, IL (US)

(72) Inventors: Michael L. Vandeven, Princeton, IA (US); Alex Brimeyer, Bettendorf, IA (US); Benjamin M. Lovett, Colona, IL (US); Duane M. Bomleny, Geneseo, IL (US); Bryan R. Yanke, Eldridge, IA (US); Joshua R. Pierson, Bettendorf, IA (US); Anthony M. Hasenour, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 180 days.

(21) Appl. No.: 16/400,097

(22) Filed: May 1, 2019

(65) Prior Publication Data
US 2020/0344951 A1 Nov. 5, 2020

(51) Int. Cl.
*A01D 41/14* (2006.01)

(52) U.S. Cl.
CPC .................. *A01D 41/141* (2013.01)

(58) Field of Classification Search
CPC .... A01D 41/14; A01D 41/141; A01D 41/145; A01D 41/16
USPC .......................................... 56/11.9, 208, 209
See application file for complete search history.

(56) References Cited

U.S. PATENT DOCUMENTS

| | | | |
|---|---|---|---|
| 5,535,577 A | 7/1996 | Chmielewski et al. | |
| 7,222,475 B2* | 5/2007 | Bomleny | A01D 41/141 56/10.2 E |
| 7,918,076 B2* | 4/2011 | Talbot | A01D 41/14 56/208 |
| 2013/0255214 A1* | 10/2013 | Nafziger | A01D 47/00 56/208 |
| 2016/0316624 A1* | 11/2016 | Ritter | A01D 41/127 |
| 2018/0153102 A1* | 6/2018 | Dunn | A01D 41/127 |
| 2019/0053429 A1* | 2/2019 | Cook | A01D 41/06 |
| 2019/0082598 A1* | 3/2019 | Seiders, Jr. | A01D 75/287 |
| 2019/0110402 A1* | 4/2019 | Vandeven | A01D 41/14 |
| 2020/0000032 A1* | 1/2020 | Shearer | A01D 41/144 |
| 2020/0375107 A1* | 12/2020 | Duerksen | A01D 57/20 |

* cited by examiner

*Primary Examiner* — Thomas B Will
*Assistant Examiner* — Matthew Ian Neal
(74) *Attorney, Agent, or Firm* — Taft Stettinius & Hollister LLP; Stephen F. Rost

(57) ABSTRACT

A system for a header assembly that has a center frame configured to pivot relative to an adapter frame about at least one center axis, a center actuator coupled to the center frame to selectively provide a biasing force thereto, a first arm assembly configured to pivot relative to the center frame about at least a first arm axis, a first actuator coupled to the first arm assembly to selectively provide a biasing force thereto, a controller in communication with the center actuator and the first actuator to selectively alter performance characteristics of the center actuator and the first actuator, and a user interface in communication with the controller and having at least a first option and a second option. Wherein, the controller adjusts the performance characteristics of both the center actuator and the first actuator when the user interface is transitioned between the first option and the second option.

20 Claims, 13 Drawing Sheets

FLOAT ADJUSTMENT

FIELD OF THE DISCLOSURE

The present disclosure related to a float adjustment system and method and more particularly to a single input float adjustment system for an agricultural harvesting head.

BACKGROUND

Agricultural harvesters, such as agricultural combines, are designed to travel through agricultural fields harvesting crops. Agricultural combines receive crop severed from the ground and convey it to threshing, separating, and cleaning devices within the agricultural combine. In a typical arrangement, the agricultural harvesting head severs the crop from the ground and conveys it to the central region of the harvesting head where it is then conveyed rearward into a central and forwardly opening aperture in the front of the agricultural combine.

Agricultural harvesting heads are quite long, on the order of 10-15 meters in overall length. In order to accurately follow the contours of the ground and sever crop at the appropriate point on the stem, agricultural harvesting heads have been made in sections that are generally hinged with respect to each other. A typical agricultural harvesting head of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

To better follow the contours of the ground, the agricultural harvesting head is mounted to the front of the feederhouse such that it can move with respect to the feeder house. In one arrangement the agricultural harvesting head is a draper head having three frame sections (a center section, a left-wing section and a right wing section). The frame sections can pivot up and down with respect to one another and thereby follow the contours of the ground.

In addition to that contour-following capability, the center frame section is mounted on an "adapter" that is fixed to the front of the feederhouse. This adapter permits the center frame section to move up and down with respect to the front of the feederhouse. It also permits the wing sections to move up and down with respect to the front of the feederhouse, since they are attached to and supported on the center frame section.

An adjustable mechanism is often positioned between the adapter frame and the center frame section to hold the center frame section up in the air at an optimum cutting height with respect to the adapter. The adjustable mechanism is often manually adjusted to alter the cutting height of the center frame.

SUMMARY

One embodiment is a system for a header assembly that has a center frame configured to pivot relative to an adapter frame about at least one center axis, a center actuator coupled to the center frame to selectively provide a biasing force thereto, a first arm assembly configured to pivot relative to the center frame about at least a first arm axis, a first actuator coupled to the first arm assembly to selectively provide a biasing force thereto, a controller in communication with the center actuator and the first actuator to selectively alter performance characteristics of the center actuator and the first actuator, and a user interface in communication with the controller and having at least a first option and a second option. Wherein, the controller adjusts the performance characteristics of both the center actuator and the first actuator when the user interface is transitioned between the first option and the second option.

In one example of this embodiment, the center actuator is a hydraulic actuator fluidly coupled to an accumulator, wherein at least one of the performance characteristics altered by the controller is the hydraulic pressure provided to the hydraulic actuator. In another example, the first actuator is a first hydraulic actuator fluidly coupled to an accumulator, wherein at least one of the performance characteristics altered by the controller is the hydraulic pressure provided to the first hydraulic actuator.

In yet another example, the center actuator is a center hydraulic actuator and the first actuator is a first hydraulic actuator, wherein the performance characteristics altered by the controller include hydraulic pressure provided to the center hydraulic actuator and the first hydraulic actuator. One aspect of this example has a center valve fluidly coupled to the center hydraulic actuator and a first valve fluidly coupled to the first hydraulic actuator, wherein the controller communicates with both the center valve and the first valve to selectively provide hydraulic fluid to the corresponding hydraulic actuator at the hydraulic pressure identified by the performance characteristic. In another aspect of this example the hydraulic pressure provided to the center hydraulic actuator is different from the hydraulic pressure provided to the first hydraulic actuator.

In another example, the user interface has a third option, a fourth option, and a fifth option, wherein each of the options corresponds with different performance characteristics. Yet another example has a second arm assembly pivotally coupled to the center frame about at least a second arm axis, a second actuator coupled to the center frame on one end and to the second arm assembly on the other end, wherein the controller is in communication with the second actuator to selectively alter performance characteristics of the second actuator and the controller adjusts the performance characteristics of the second actuator when the user interface is transitioned between the first option and the second option. In another example, the center axis and the first arm axis are about ninety degrees offset from one another.

Another example of this embodiment has a first arm assembly sensor that identifies an arm position relative to the center frame, and a center frame sensor that identifies a center frame position relative to the adapter frame. In one aspect of this example, the performance characteristics include threshold position ranges for the arm position and the center frame position and the controller repositions the first actuator and the center actuator to position the corresponding center frame and first arm assembly into the threshold position ranges.

Another embodiment is a system for adjusting a header assembly of a combine where the system has a center frame pivotally coupled to an adapter frame about at least one center axis, a center actuator configured to reposition the center frame, a first arm assembly configured to be pivotal relative to the center frame about at least a first arm axis, a first actuator configured to reposition the first arm assembly, a second arm assembly configured to be pivotal relative to the center frame about at least a second arm axis, a second actuator configured to reposition the second arm assembly, a controller in communication with the center actuator, the first actuator, and the second actuator to selectively alter performance characteristics of the center actuator, first actuator, and second actuator, and a user interface in communication with the controller and having at least a first option and a second option. Wherein, the controller adjusts the performance characteristics of at least one of the center actuator, the first actuator, and the second actuator when the user interface is transitioned between the first option and the second option.

In one example of this embodiment, each of the center actuator, the first actuator, and the second actuator are hydraulic actuators, wherein at least one of the performance characteristics altered by the controller is the hydraulic pressure provided to at least one of the center actuator, the first actuator, and the second actuator. One aspect of this example includes at least one accumulator fluidly coupled to at least one of the center actuator, the first actuator, and the second actuator. In another aspect of this example the performance characteristics altered by the controller is the hydraulic pressure provided to each of the center actuator, the first actuator, and the second actuator. Yet another aspect of this example includes a valve assembly that selectively provides hydraulic fluid to each of the center actuator, the first actuator, and the second actuator from a hydraulic source, wherein the controller communicates with the valve assembly to selectively provide hydraulic fluid to each of the center actuator, the first actuator, and the second actuator at a hydraulic pressure identified by the performance characteristics associated with the selected option.

Another example of this embodiment, the first arm axis and the second arm axis are about ninety degrees offset from the center axis.

Yet another embodiment is a method for adjusting a header assembly of a combine, that includes providing a center frame pivotally coupled to an adapter frame about at least one center axis, an center actuator coupled to the center frame, a first arm assembly pivotally coupled to the center frame about at least a first arm axis, a first actuator coupled to the first arm assembly, a second arm assembly pivotally coupled to the center frame about at least a second arm axis, a second actuator coupled to the second arm assembly, a controller in communication with the center actuator, the first actuator, and the second actuator, a user interface, and a sensor assembly, providing, with the user interface, at least a first option and a second option that is selectable by a user, storing, in the controller, a first set of performance characteristic thresholds associated with the first option and a second set of performance characteristic thresholds associated with the second option, identifying, with the user interface, when the first option or the second option are selected, identifying current values for the center frame, first frame assembly, and second frame assembly with the sensor assembly and communicating the current values to the controller, comparing the current values with the performance characteristic thresholds associated with the selected first option or second option, altering a corresponding one or more of the center actuator, the first actuator, and the second actuator with the controller when the current values are not within the performance characteristics thresholds of the selected first or second option.

In one example of this embodiment, the center actuator, the first actuator, and the second actuator are hydraulic actuators and the first set of performance characteristic thresholds and the second set of performance characteristic thresholds are hydraulic pressure thresholds that correspond with each of the center actuator, the first actuator, and the second actuator. In another example, the first and second set of performance characteristic thresholds are determined by the controller with reference to a float curve chart.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
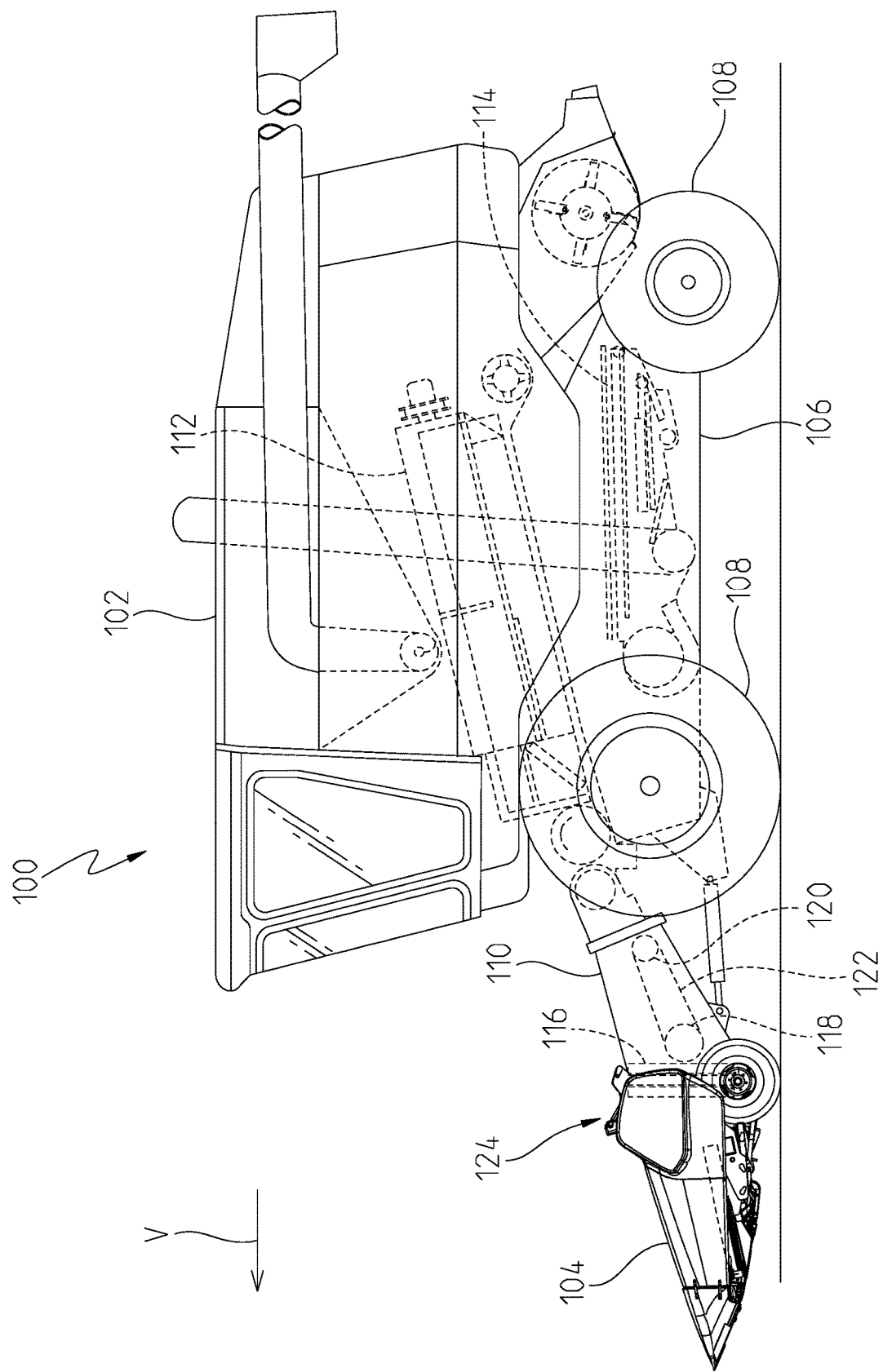
FIG. 1 is a side view of an agricultural harvester.
Figure 2:
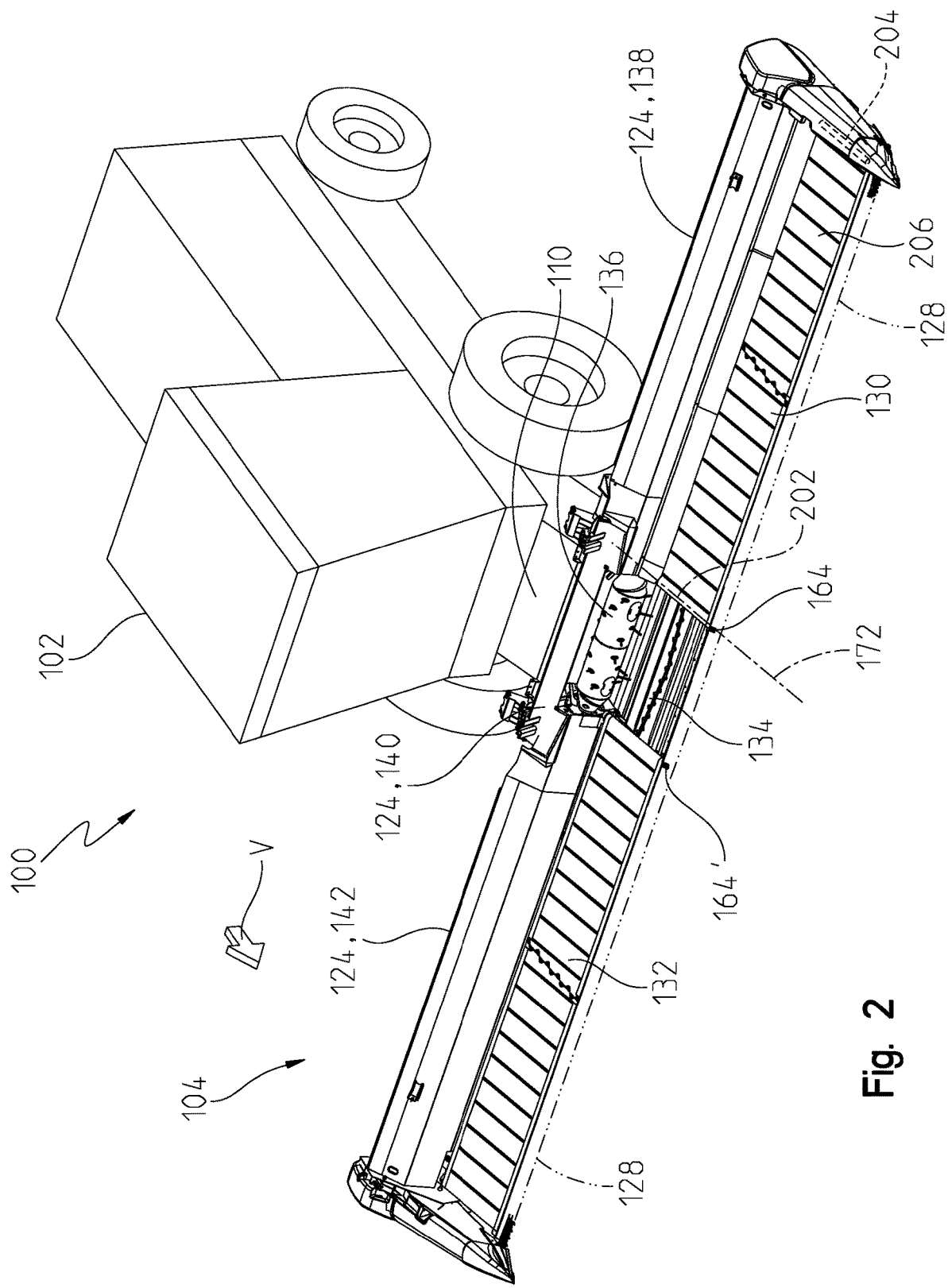
FIG. 2 is a perspective view of an agricultural harvesting head of the harvester of FIG. 1.
Figure 3:
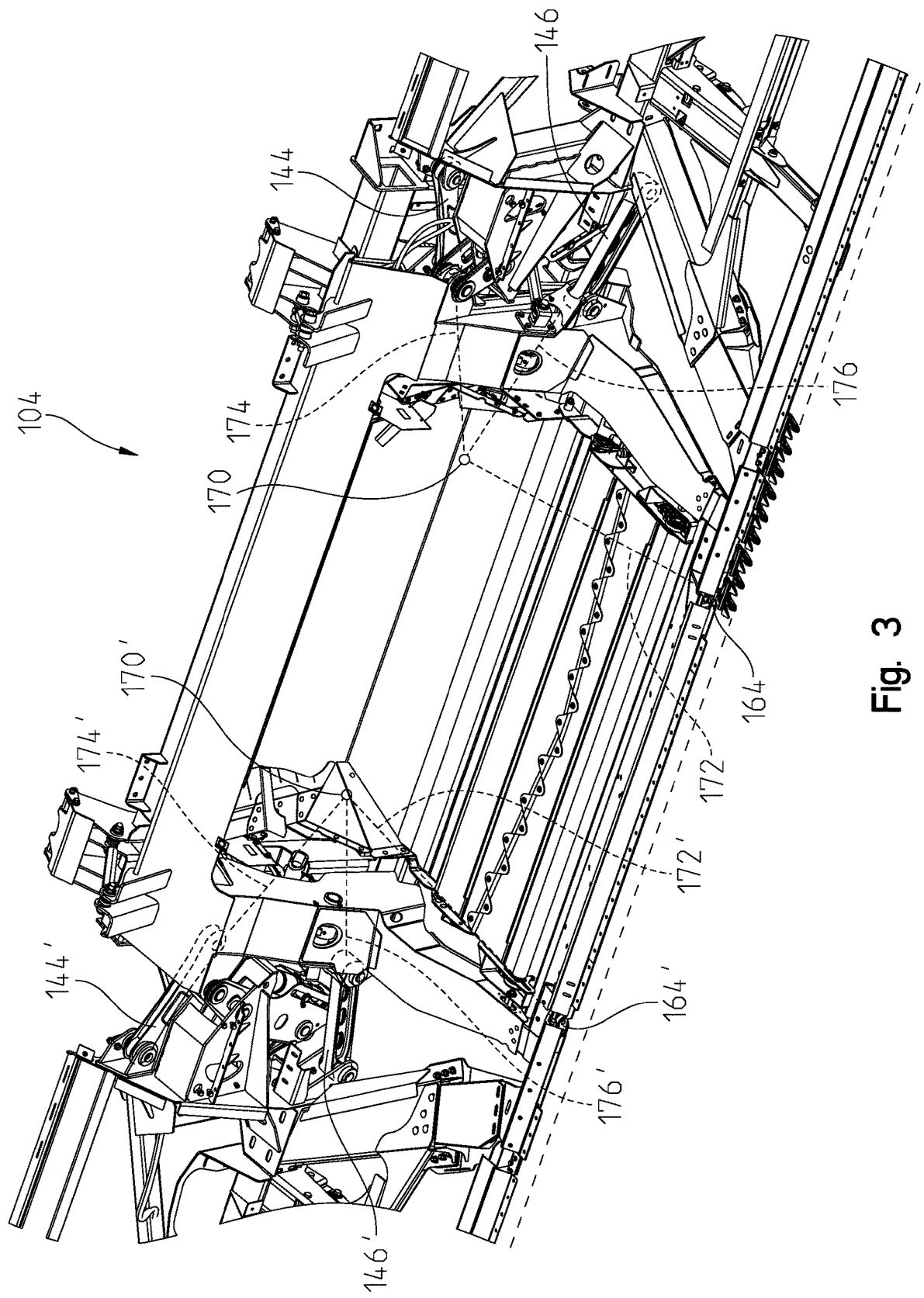
FIG. 3 is a partial front perspective view of the frames of the agricultural harvester of FIG. 2 with conveyors removed.
Figure 4:
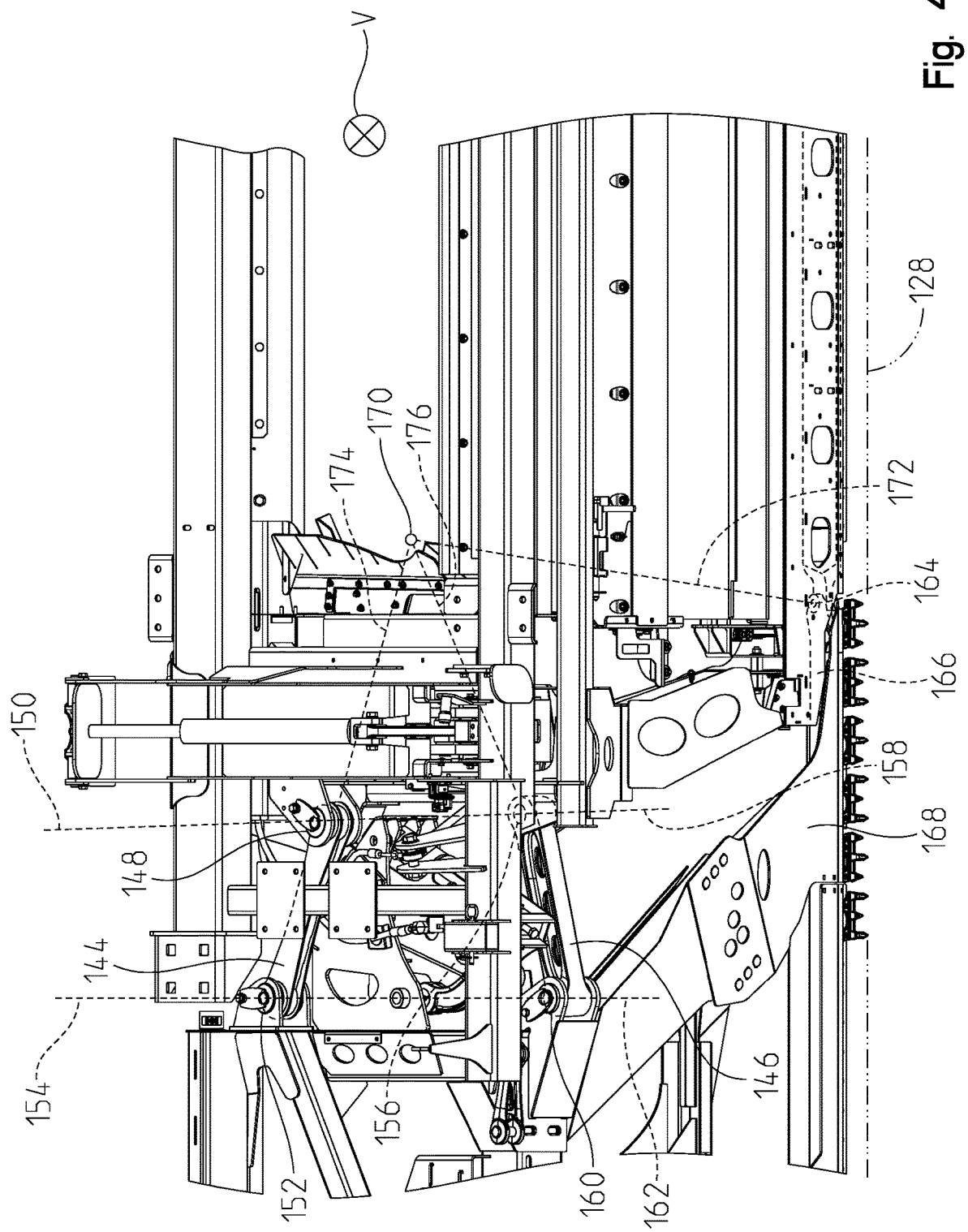
FIG. 4 is a partial front perspective view of the view of the center frame and adapter frame shown in FIG. 3.
Figure 5:
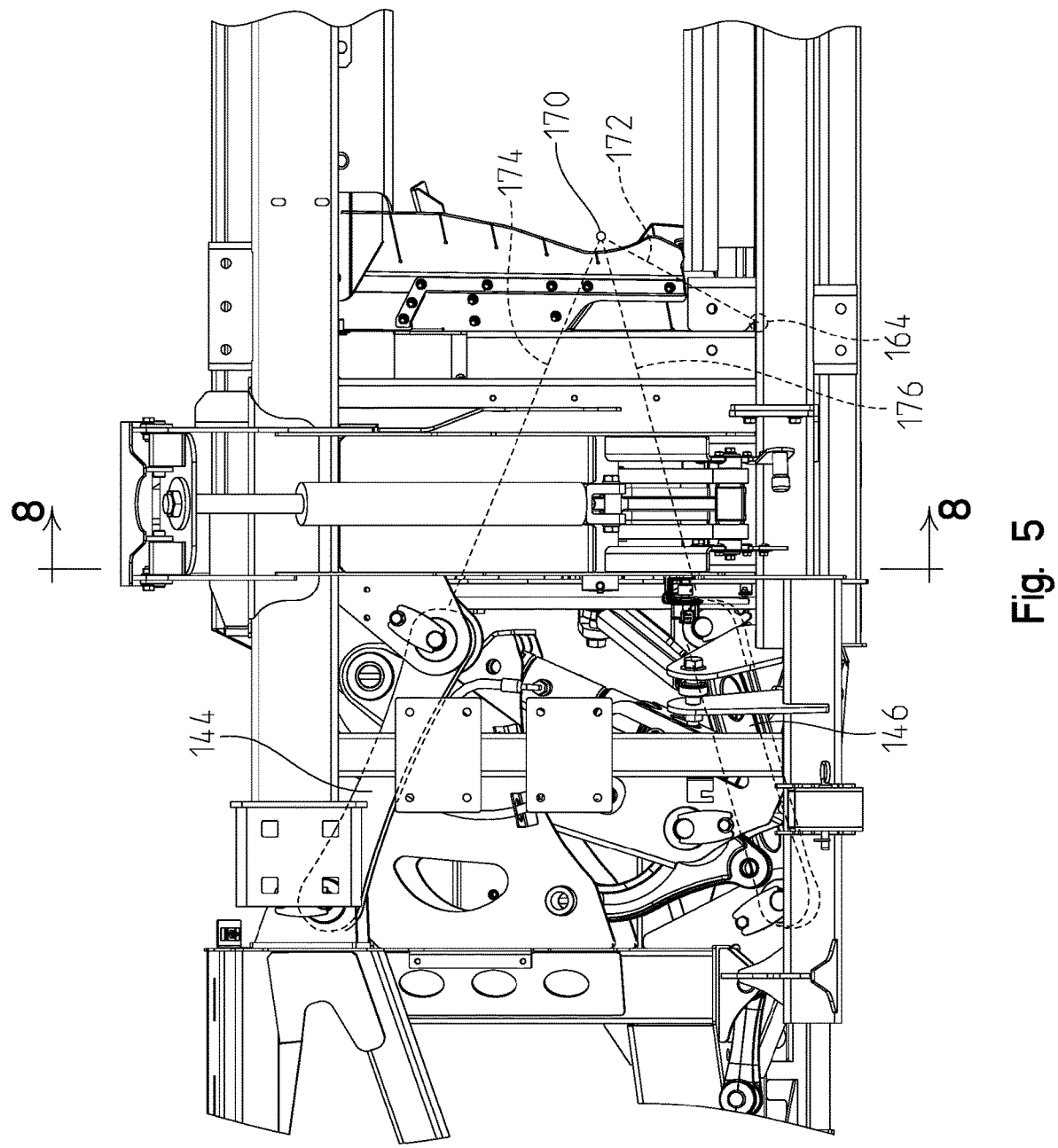
FIG. 5 is a slightly elevated fractional rear view of the frames shown in FIGS. 3-4.
Figure 6:
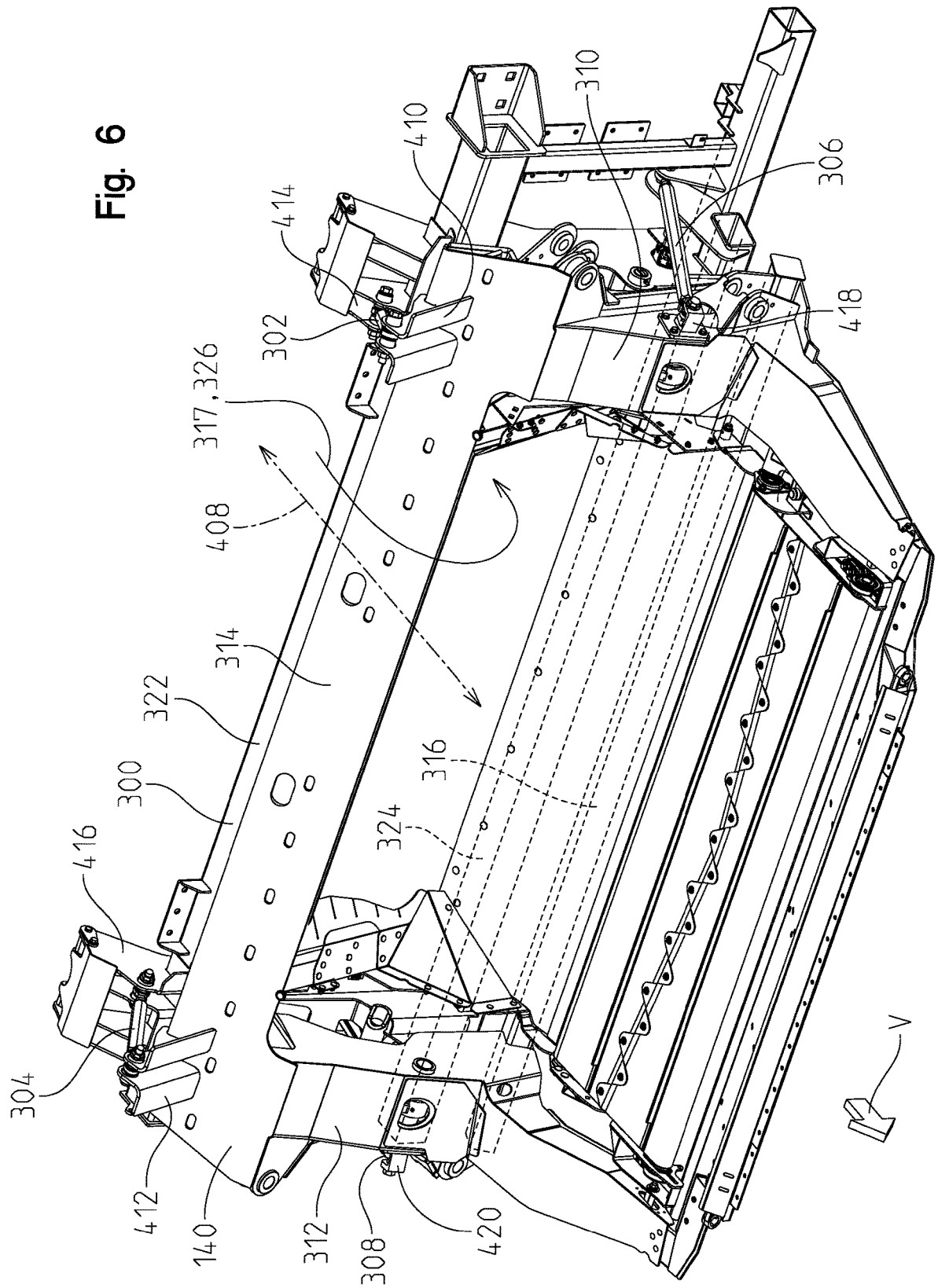
FIG. 6 is a fractional front perspective view of FIG. 3 with the left and right frames and linkages removed.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

FIG. 1 illustrates an agricultural harvester 100 that has an agricultural combine 102 and an agricultural harvesting head 104. The agricultural combine 102 comprises a chassis 106 which is supported on four ground supports 108, as well as a threshing and separating system 112, a cleaning system 114, and a feederhouse 110 extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and cleaned.

The agricultural combine 102 is a self-propelled vehicle which is driven over the ground by a power source such as an electric motor or motors or an internal combustion engine. The ground supports 108 are preferably wheels or tracks. At least one of them are driven in rotation by motors to propel the agricultural combine 102 over the ground.

The feederhouse 110 is pivotally connected to the front of the agricultural combine and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular frame 116 that is configured to support the agricultural harvesting head 104. A front roller 118 is disposed immediately inside the frame 116. A corresponding rear roller 120 is disposed at the rear end of the feederhouse 110. The front roller 118 and the rear roller 120 support opposing ends of a conveyor belt 122. Each of the front roller 118 and the rear roller 120 may be in the form of a narrow shaft with a plurality of sprockets or gears that engage the inner surface of the conveyor belt 122. A rotary motor (electric, hydraulic, or pneumatic) is coupled to the rear roller 120 to drive the rear roller 120 in rotation. This rotation causes the conveyor belt 122 to recirculate in an endless fashion around the front roller 118 and the rear roller 120. The conveyor belt 122 has protrusions, such as cleats or lugs that engage a top surface of a mat of cut crop (not shown) that is presented to the frame 116. The movement of the conveyor belt 122 draws the mat into the feederhouse and carries it upward on the floor of the feederhouse until it is conveyed through the open rear end of the feederhouse 110 and sent to the threshing, separating and cleaning systems of the agricultural combine 102.

The frame 116 is generally rectangular and includes a top member and a bottom member that are generally parallel to each other, are spaced apart, and extend generally parallel to the longitudinal extent of the agricultural harvesting head 104. The frame 116 also includes a left side member and a right side member that are parallel to each other, spaced apart, and extend vertically.

The agricultural harvesting head 104 includes a laterally extending main frame 124 that extends perpendicular to a fore-and-aft harvesting direction of travel "V" of the agricultural harvester 100 and perpendicular to the longitudinal axis of the agricultural combine 102. The agricultural harvesting head 104 further includes an elongate reciprocating knife 128 that extends across almost the entire width of the agricultural harvesting head 104. This reciprocating knife is disposed immediately in front of three cut crop conveyors. These three cut crop conveyors include a left side conveyor 130 that carries cut crop from the left side of the agricultural harvesting head 104 to a central region of the agricultural harvesting head 104, a right side conveyor 132 that carries crop from the right side of the agricultural harvesting head 104 to the central region of the agricultural harvesting head 104, and a central conveyor 134 that receives crop from the left side conveyor 130 and the right side conveyor 132, and conveys the cut crop rearward and underneath a drum conveyor 136. Each of these three conveyors is an endless belt conveyor and is disposed immediately behind the reciprocating knife 128 to receive crop cut by the reciprocating knife 128.

The laterally extending main frame 124 includes three frame sections that are coupled together to pivot with respect to each other about fore-and-aft extending axes. Left frame section 138 extends from the outer left end of the agricultural harvesting head to a central region of the agricultural harvesting head 104. Center frame section 140 extends across a middle portion of the agricultural harvesting head 104. Right frame section 142 extends from the outer right end of the agricultural harvesting head 104 to the central region of the agricultural harvesting head 104.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless belt 206. A motor drives the proximal roller 202 in rotation. The proximal roller 202 recirculates in turn the endless belt 206 about the proximal roller 202 and the distal roller 204. Crop material cut by the reciprocating knife 128 in front of the left frame section 138 falls upon the top surface of the endless belt 206 and is drawn toward the center frame section 140.

The inner end of the left frame section 138 is connected to the center frame section 140 to pivot up and down at its outer end with respect to the center frame section 140. The inner end of the right frame section 142 is connected to the center frame section 140 to pivot up and down at its outer end with respect to the center frame section 140.

An upper left link 144 and a lower left link 146 extend between and couple the left frame section 138 and the center frame section 140. An identically constructed and mirror image upper right link 144' and a lower right link 146' extend between and couple the right frame section 142 in the center frame section 140.

A proximal end of the upper left link 144 is coupled to the center frame section 140 by a first pivot joint 148 and is configured to pivot with respect to the center frame section 140 about a first axis 150 that extends generally in the direction of travel "V".

An opposing distal end of the upper left link 144 is coupled to the left frame section 138 by a second pivot joint 152 and is configured to pivot with respect to the left frame section 138 about a second axis 154 that extends in the direction of travel "V".

A proximal end of the lower left link 146 is coupled to the center frame section 140 by a third pivot joint 156 and is configured to pivot with respect to the center frame section 140 about a third axis 158 that extends in the direction of travel "V".

An opposing distal end of the lower left link 146 is coupled to the left frame section 138 by a fourth pivot joint 160 and is configured to pivot with respect to the left frame section 138 about a second axis 162 that extends in the direction of travel "V".

A hinge joint 164 is disposed adjacent to the reciprocating knife 128 at a forward edge of the agricultural harvesting head 104. The hinge joint 164 couples a forwardly extending member 166 of the center frame section 140 to a forwardly extending member 168 of the left frame section 138.

An identically constructed and mirror image hinge joint 164' is disposed adjacent to the reciprocating knife 128 and forward edge of the agricultural harvesting head 104. The hinge joint 164' couples a forwardly extending member of the center frame section 140 a forwardly extending member of the right frame section 138.

The attachment points of the proximal ends of the upper left link 144 and the lower left link 146 are closer together (as measured in a vertical direction) than the attachment points of the distal ends of the upper left link 144 and the lower left link 146.

The two attachment points of the upper left link 144 define a first construction line 174 extending through both of the attachment points of the upper left link 144. The two attachment points of the lower left link 146 define a second construction line 176 extending through the attachment points of the lower left link 146.

The first construction line and the second construction line are not parallel. When viewed from the rear of the agricultural harvesting head 104 they intersect each other at a point of intersection 170. Whenever the left frame section 138 pivots up and down with respect to the center frame section 140, these sections pivot with respect to each other about the point of intersection 170.

Since the right side of the agricultural harvesting head 104 is identically constructed (but in mirror image fashion) as the left side, the same intersection, pivot line, 1st construction line, and second construction line are also provided on the right side of the agricultural harvesting head 104 and are denoted with the numbers 170',172',174' and 176.

In the illustrated example, the point of intersection 170 is located closer to the longitudinal and vertical midplane of the center frame section 140 than all four of the attachment points of the upper left link 144 and the lower left link 146 to the left frame section 138 and the center frame section 140.

The pivoting axis of the hinge joint 164 is disposed forward of and slightly below the point of intersection 170 of the two construction lines. Thus, the left frame section 138 is constrained by the hinge joint 164, the upper left link 144 and the lower left link 146 to pivot with respect to the center frame section 140 about a pivot line 172 that extends through the point of intersection 170 and through the pivoting axis of the hinge joint 164. The pivot line 172 also extends through or immediately adjacent to the reciprocating knife 128. In this manner, whenever the left frame section 138 pivots with respect to the center frame section 140, the reciprocating knife 128 (which extends across both the left frame section 138 and the center frame section 140) can flex without being damaged.

The reciprocating knife 128 is typically close to the ground where it can sever plant stalks close to the ground. The rear portion of the three frame sections, the upper left link 144 and the lower left link 146 are commonly elevated above the ground to provide ground clearance. For this reason, the pivot line 172 extends forward and slightly downwardly from the point of intersection 170 to the hinge joint 164.

The pivot line 172 extends through the proximal roller 202. The rotational axis of the proximal roller 202 is collinear with the pivot line 172. Thus, when the left frame section 138 pivots up and down with respect to the center frame section 140, the proximal roller 202 does not move with respect to the left frame section 138 and the center frame section 140.

The center frame section 140 is illustrated coupled to and supported on an adapter frame 300. The adapter frame 300 is in turn coupled to and supported on the feederhouse frame 116. Four links, including an upper left link 302, an upper right link 304, a lower left link 306, and a lower right link 308 are coupled to and between the center frame section 140 and the adapter frame 300. A forward end of each of the four links is coupled to the center frame section 140 and a rear end of each of the four links is coupled to the adapter frame 300. The four links extend at least partially fore-and-aft.

The center frame section 140 is generally rectangular and extends vertically and transverse to the direction of travel "V". It has two laterally spaced apart vertical side members 310, 312, an upper horizontal member 314 that is fixed at both ends to an upper portion of the side members 310, 312, and a lower horizontal member 316 that is fixed at both ends to a lower portion of the side members 310, 312. The lower horizontal member 316 is spaced apart and disposed below the upper horizontal member 314. The side members 310, 312 are parallel to each other. The upper horizontal member 314 and the lower horizontal member 316 are parallel to each other. These four members 310, 312, 314, 316 are fixed together to define a rigid rectangular frame having a central aperture 317 configured to receive and transmit all the cut crop harvested by the agricultural harvesting head 104.

The adapter frame 300 is generally rectangular and extends vertically and transverse to the direction of travel "V". It has two laterally spaced apart vertical side members 318, 320, an upper horizontal member 322 that is fixed at both ends to an upper portion of the side members 318, 320, and lower horizontal member 324 that is fixed at both ends to a lower portion of the side members 318, 320. The lower horizontal member 324 is spaced apart and disposed below the upper horizontal member 322. The side members 318, 320 are parallel to each other. The upper horizontal member 322 and the lower horizontal member 324 are parallel to each other. These four members 318, 320, 322, 324 are fixed together to define a rigid rectangular frame having a central aperture 326 that is configured to receive and transmit all the cut crop material harvested by the agricultural harvesting head 104, and in particular to receive all the cut crop material conveyed through the central aperture 317 of the center frame section 140.

The four links 302, 304, 306, 308 extend between and are coupled to the center frame section 140 and the adapter frame 300. The two lower links 306, 308 have the same length. Each of the four links 302, 304, 306, 308 may be formed as turnbuckles with threaded ball joints at each end to permit the length of the links (and thus the angle of the mainframe 124) to be readily adjusted for a variety of crops. Alternatively, the four links 302, 304, 306, 308 may have a fixed length.

The four links are coupled at their forward ends to the center frame section 140 and at their rear ends to the adapter frame 300. The pivot joints that couple the links to the frames permit the frames to move up and down with respect to each other, and permit the frames to rotate with respect to each other about an axis 408 that extends in a fore-and-aft direction. This axis extends through the central apertures of both the center frame section 140 and the adapter frame 300.

The upper links (links 302, 304) are spaced apart and are pivotally coupled at their forward ends to brackets 410, 412, respectively. Brackets 410, 412 are fixed to and extend upward from the upper horizontal member 314. The brackets are spaced apart on the upper horizontal member 314. Bracket 410 is fixed to the upper horizontal member 314 adjacent to the upper end of the vertical side member 310. Bracket 412 is fixed to the upper horizontal member 314 adjacent to the upper end of the vertical side member 312.

The upper links (links 302, 304) are spaced apart and are pivotally coupled at their rear ends to brackets 414, 416, respectively. Brackets 414, 416 are fixed to and extend upward from the upper horizontal member 322 of the adapter frame 300. The brackets are spaced apart on the upper horizontal member 322. Bracket 414 is fixed to the upper horizontal member 322 adjacent to the upper end of the vertical side member 318. Bracket 416 is fixed to the upper horizontal member 322 adjacent to the upper end of the vertical side member 320.

Figure 7:
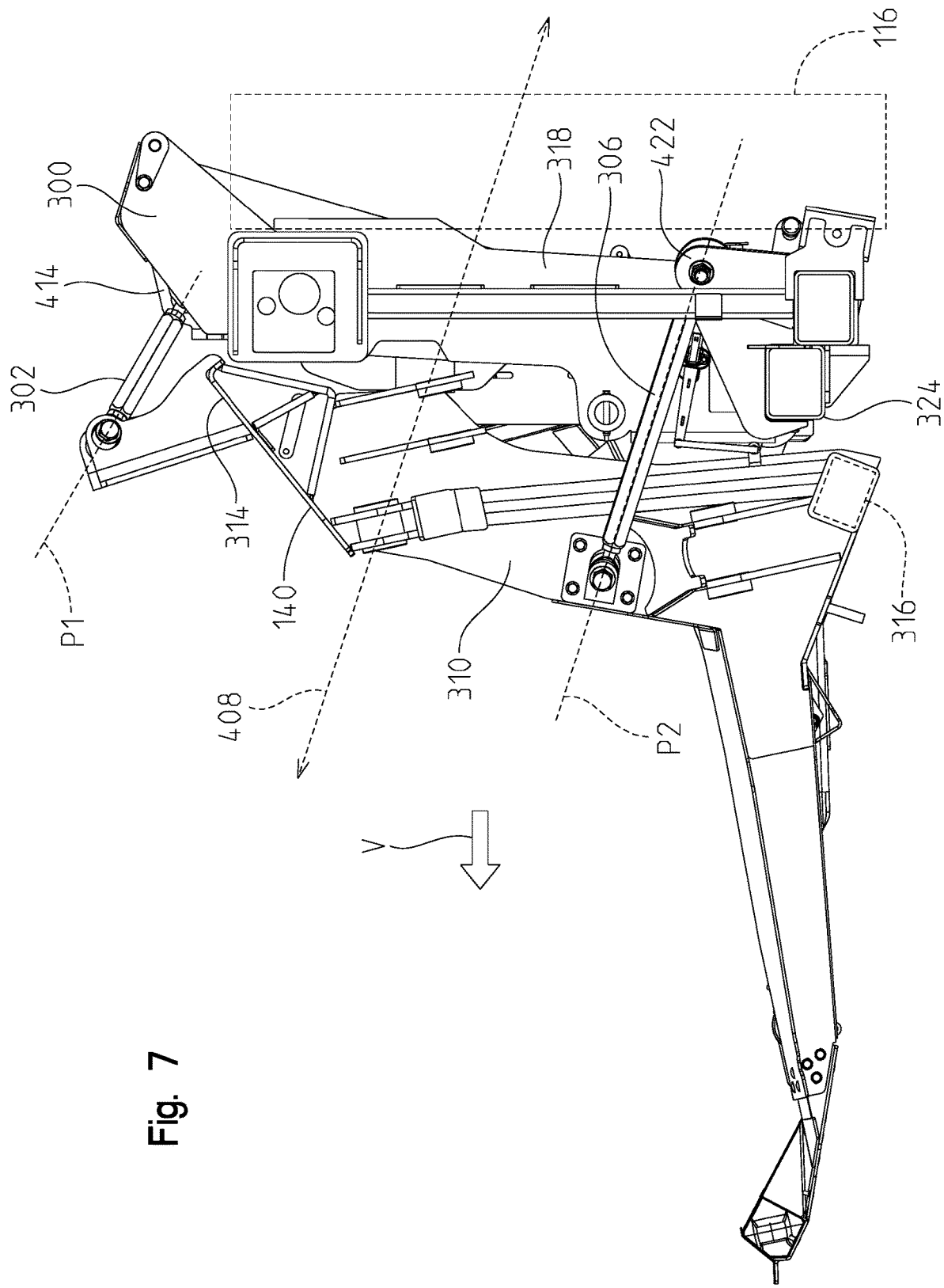
FIG. 7 is a left side view of the arrangement illustrated in FIG. 6.
Figure 8:
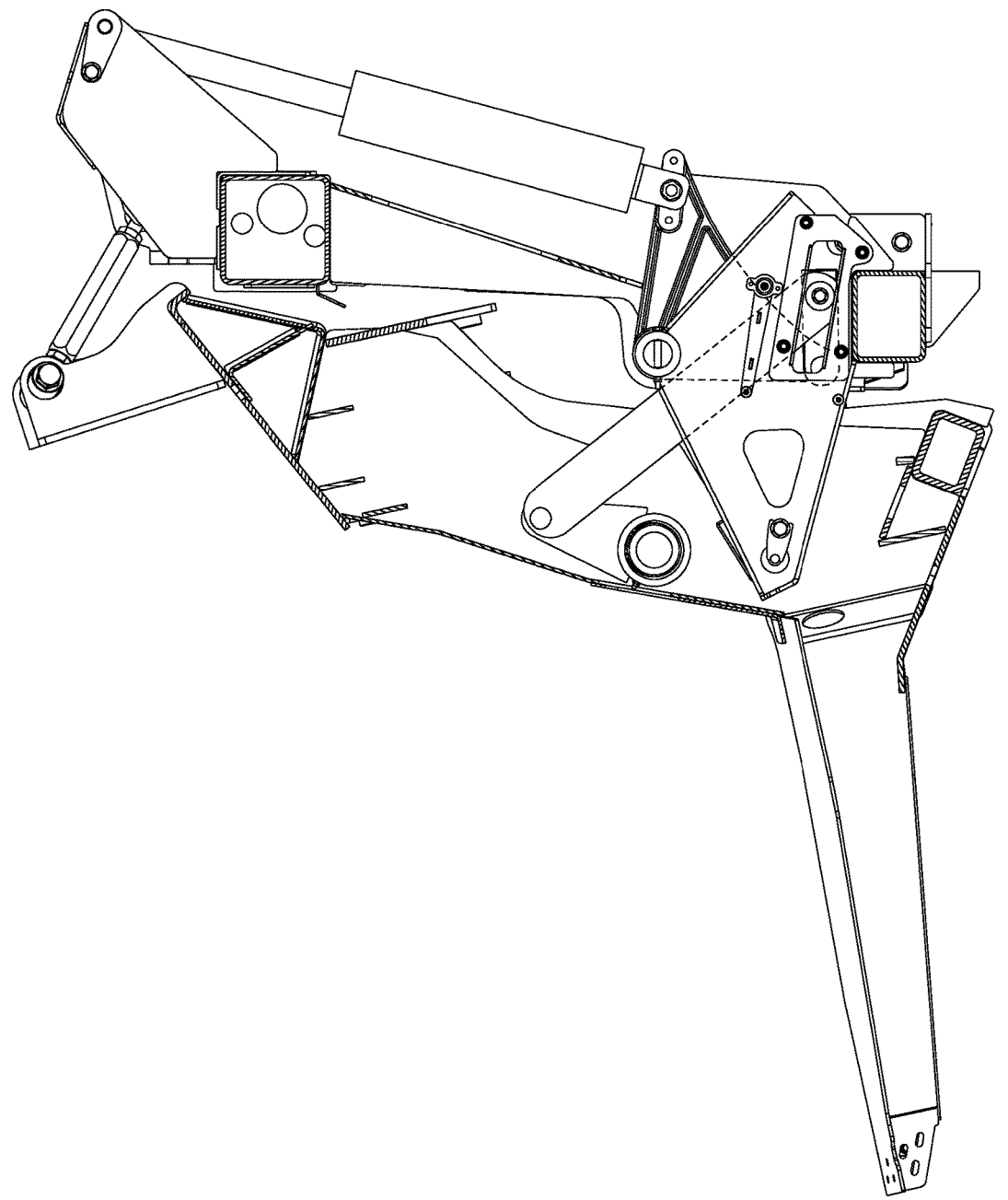
FIG. 8 is a fragmentary left side view of a linkage taken at section line 8-8 in FIG. 5.

The two upper links 302, 304 have the same length between their pivot connections to the frames at each end. The two upper links 302, 304 lie in a first common plane "P1" (see FIG. 7).

The lower links (links 306, 308) are spaced apart and are pivotally coupled at their forward ends to brackets 418, 420, respectively. Bracket 418 is fixed to and extends laterally outward from a lower portion of vertical side member 310 adjacent to the left end of lower horizontal member 316. Bracket 420 is fixed to and extends laterally outward from a lower portion of vertical side member 312 adjacent to the right end of lower horizontal member 316.

The lower links (links 306, 308) are spaced apart and are pivotally coupled at their rear ends to brackets 422, 424, respectively. Bracket 422 is fixed to and extends upward from a lower left portion of adapter frame 300. Bracket 424 is fixed to and extends upward from a lower right portion of adapter frame 300. The two lower links 306, 308 have the same length between their pivot connections to the frame at each end. The two lower links 306, 308 lie in a second common plane.

When viewing the center frame section 140 and the adapter frame 300 from the rear, the links 302, 304, 306, 308 are disposed at the upper left, upper right, lower left, and lower right corners of the apertures 317, 326. The links collectively surround the apertures 317, 326.

All four of the links 302, 304, 306, 308 extend generally fore-and-aft and are generally parallel. However, they are not perfectly parallel, nor do they extend perfectly fore-and-aft. In fact, they are slightly nonparallel in order to provide particular benefits that four perfectly parallel links would not provide.

In particular, the two upper links 302, 304 extend forward and outward. Thus, the distance between the two upper links at their pivotal attachment points on the center frame section 140 is greater than the distance between the two upper links at their pivotal attachment points on the adapter frame 300. The two lower links 306, 308 extend forward and inward. Thus, the distance between the two lower links at their attachment points on the center frame section 140 is less than the distance between the two lower links at their attachment points on the adapter frame 300.

By arranging the spacing of the attachment points (and therefore the direction the two upper links and the two lower links extend) as shown, the center frame section 140 and the adapter frame 300 cannot be translated side to side with respect to each other. If a great force was applied to force side to side (lateral) translation of the two frames with respect to the other, either one or more of the links will break and/or one or more of the frames will break. The links and the frames are robust enough that during normal operation no such lateral translation nor any link or frame breakage will occur under normal operational loading.

While four links 302, 304, 306, 308 are illustrated and described herein, the adapter frame 300 may also be coupled to the center frame section 140 with only three links as is known in the art. Accordingly, this disclosure contemplate utilizing any number of links, or no links at all, in order to pivotally coupled the frame section 140 to the adapter frame.

An actuator or the like couples the adapter frame 300 to the center frame section 140. The actuator may support the weight of the center frame section 140 and the components coupled thereto, such that the center frame section is partially or fully suspended in a floating position on links 302, 304, 306, 308.

As is discussed in more detail herein, in one aspect of this disclosure the operator can adjust actuator (see center actuator 902 of FIG. 9) to provide a large lifting force on the center frame section 140 that support substantially the entire weight of the agricultural harvesting head 104. The operator will adjust this large lifting force such that the ground force acting upward against the bottom of the agricultural harvesting head 104 is quite small.

The operator desires that the ground force stays relatively constant. If the ground force increases, it may cause the reciprocating knife 128 to dig into the ground. If the ground force decreases the reciprocating knife 128 may be lifted entirely off the ground, away from the plant stalks it is supposed to cut.

The center actuator 902 applies a constant upward force against the main frame 124 in a wide range of operating positions, and therefore maintains a constant ground force against the ground. The center actuator 902 may include a left side center actuator 902 and a right side center actuator 902. The left side center actuator 902 extends between and couples the adapter frame 300 and the center frame section 140 on the left side of the adapter frame 300. The right side center actuator 902 extends between and couples the adapter frame 300 and the center frame section 140 on the right side of the adapter frame 300. The two actuators 902 and corresponding linkages are similarly constructed and are substantially mirror images of each other. Therefore the construction and operation of the left side center actuator 902 is substantially the same as the right side center actuator 902.

Similarly, the right and left frame section 142, 138 may implement one or more actuator (see first actuator 1008 and second actuator 1016 of FIG. 10) to modify the ground force experienced by the corresponding right and left frame sections 142, 138 as the agricultural harvesting head 104 travels there along. Accordingly, as discussed in more detail herein the agricultural harvesting head 104 may require adjustments to both the center actuators 902 to modify the center frame section 140 and the first and second actuators 1008, 1016 to modify the response of the right and left frame section 142, 138 to properly adjust the way the agricultural harvesting head 104 responds to ground force changes.

Figure 9:
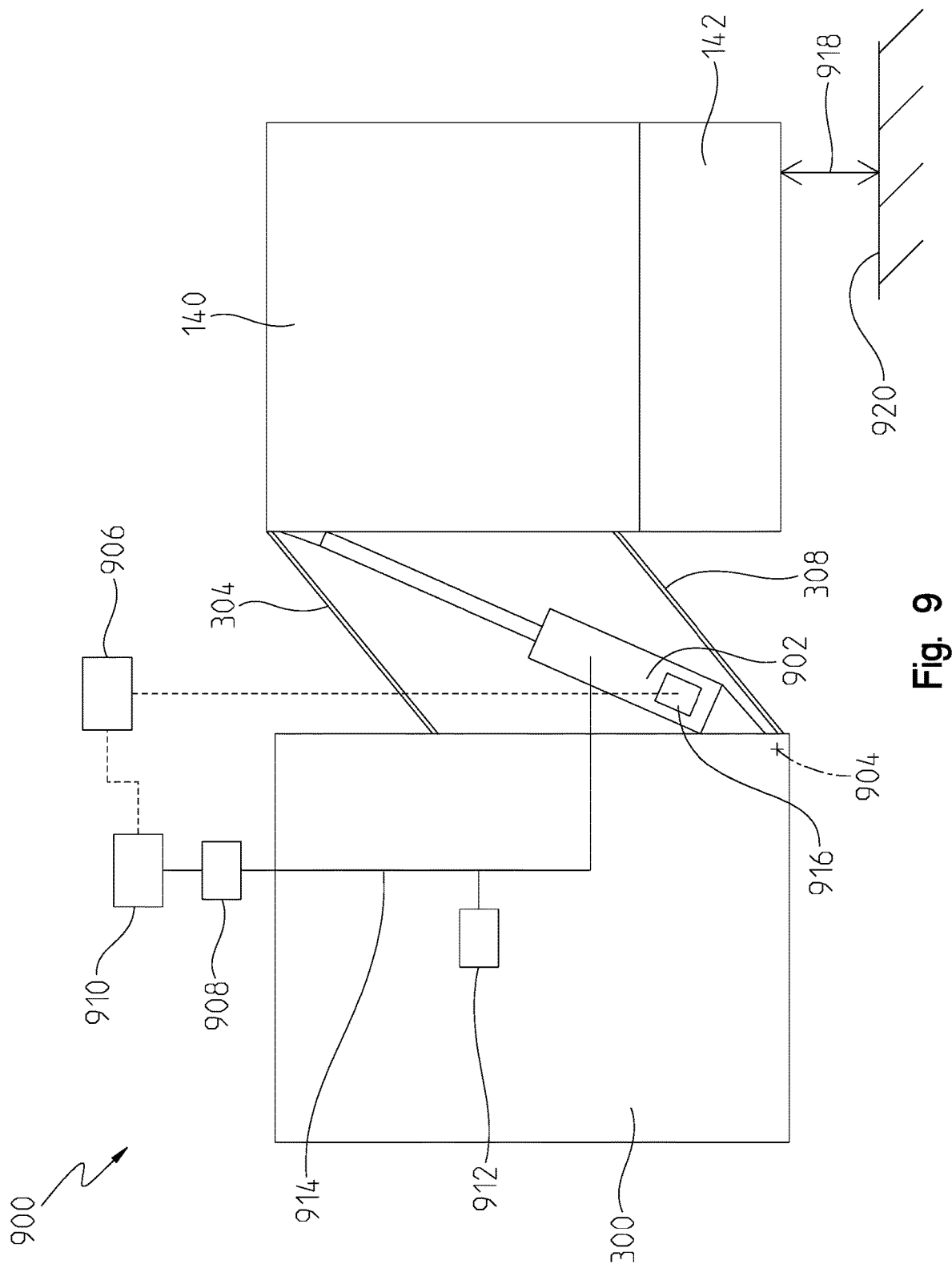
FIG. 9 is a schematic side view of one embodiment of an adapter frame coupled to a center frame.

Referring now to FIG. 9, a schematic side view 900 of one embodiment of this disclosure is illustrated. The schematic side view 900 is meant to generally illustrate one example of a coupling configuration between the adapter frame 300 and the center frame 140. While FIGS. 1-8 show and describe a very specific way to pivotally couple the agricultural harvesting head 104 to the agricultural combine 102, a person skilled in the art understands the teaching discussed herein can be applied to any configuration that has an adjustable center section and at least one arm assembly regardless of the exact methodology used to pivotally coupled the assemblies to one another.

Accordingly, this disclosure contemplates coupling the adapter frame 300 to the center frame 140 utilizing any mechanical configuration known in the art wherein an actuator, spring, or the like can be implemented to reposition the center frame 140 relative to the adapter frame 300. Further, while the center frame 140 is illustrated and discussed herein as being coupled to the feederhouse frame 116 of the feederhouse 110, in other embodiments the center frame 140 is pivotally coupled directly to the chassis 106. Accordingly, the center frame 140 can be pivotally coupled to any portion of the harvester 100.

In the schematic side view 900, the upper right link 304 and lower right link 308 are illustrated extending from the adapter frame 300 to the center frame 140. Similarly, upper and lower left links may extend from the adapter frame 300 to the center frame 140 although the left links are not visible in the side view of FIG. 9. Further, left and right frame sections 138, 142 may be pivotally coupled to the center frame 140 as discussed herein (left frame section not visible in FIG. 9).

In one aspect of this disclosure, one or more center actuator 902 may be positioned between the adapter frame 300 and the center frame 140 to cause the center frame 140 to move relative to the adapter frame 300. While only one center actuator 902 is illustrated and discussed with reference to FIG. 9, one embodiment of this disclosure implements a left and right side center actuator 902. Further, in one non-exclusive example, the center actuator 902 may be a linear actuator such as a hydraulic cylinder. In this example, the center actuator 902 can extend and contract to thereby alter the positioned of the center frame 140 relative to the adapter frame 300. More specifically, the center frame 140 may be coupled to the adapter frame utilizing a four-bar or the like linkage assembly as discussed herein. In this configuration, the center actuator 902 may be repositioned to pivot the center frame 140 partially around a center axis 904 defined by a pivot point of the lower link 308. Accordingly, as the center actuator 902 is repositioned, the center frame 140 may raise and lower correspondingly relative to the adapter frame 300.

In one aspect of this disclosure, there may be two center actuators 902 coupled between the adapter frame 300 and the center frame 140. Further still, on other embodiments there may be more than two center actuators 902. Accordingly, this disclosure contemplates utilizing any number of center actuators 902 required to address the expected loads on the center frame 140.

The center actuator 902 may be any known type of actuator. More specifically, the center actuator 902 may be a pneumatic or hydraulic actuator that utilizes a piston and rod at least partially within a cylinder to accommodate linear displacement based on a fluid provided to chambers of the cylinder at a pressure and volume. Further still, the center actuator 902 may be an electrically powered linear actuator that is capable of linear displacement based on the electrical power provided thereto. Accordingly, this disclosure contemplates utilizing any type of actuator capable of linear displacement known in the art as the center actuator 902.

Regardless the type of actuator, the center actuator 902 may be controlled by a controller 906. For example, if the center actuator 902 is a hydraulic or pneumatic actuator, the controller 906 may selectively change the fluid pressure provided to the center actuator 902 through a center valve 908. More specifically, the center valve 908 may be a variable valve that allows the controller to selectively couple the center actuator 902 to a fluid source 910 at varying pressures. Alternatively, if the center actuator 902 is an electrical actuator, the controller 906 may control the electrical power provided to the center actuator 902.

In one embodiment of FIG. 9, the center actuator 902 is a hydraulic actuator coupled to a hydraulic source 910, such as a pump, through the center valve 908. As discussed herein, the center valve 908 may be a variable valve controlled by the controller 906 to selectively fluidly couple the center actuator 902 to the hydraulic source 910 at a fluid pressure that corresponds with performance characteristics identified by the controller 906. Further still, in one embodiment an accumulator 912 may be fluidly coupled to a fluid line 914 that fluidly couples the center valve 908 to the center actuator 902. The accumulator 912 may be any known type of hydraulic accumulator that allows the center actuator 902 to springedly support the center frame 140. More specifically, while the controller 906 may alter the fluid pressure provided to the center actuator 902 with the center valve 908 to raise or lower the center frame 140 relative to the adapter frame 300, the accumulator 912 may allow the center actuator 902 to address force changes with a spring like response. In other words, if the center actuator experiences an excessive compressive force, the fluid therein may be forced into an expanding fluid chamber of the accumulator 912 allowing the center actuator to be linearly displaced by the compressive force.

In another aspect of this disclosure, a center frame sensor 916 may be in communication with the controller 906 to identify a value. In the example where the center actuator 902 is a hydraulic or pneumatic actuator, the center frame sensor 916 may be a pressure sensor fluidly coupled to the center actuator 902 or other portion of the fluid line 914 to identify a fluid pressure therein. Alternatively, in another example the center frame sensor 916 may be a position sensor that identifies the position of an actuator rod relative to an actuator cylinder. In other embodiments the center frame sensor 916 is a position sensor coupled to a linkage or the like to identify the position of the center frame 140 relative to the adapter frame 300. Further still, one embodiment considered herein includes both a position sensor and a pressure sensor as part of the center frame sensor 916.

Regardless of the type or location of the center frame sensor 916, the controller 906 may utilize the values identified by the center frame sensor 916 to indicate the performance characteristics of the center frame 140 relative to the adapter frame 300. More specifically, if the center frame sensor 916 is a pressure sensor, the values identified by the controller 906 may indicate the load on the center actuator 902. Further still, higher pressures may indicate to the controller 906 that the center frame 140 is at least partially raised relative to the underlying surface. In yet another embodiment, higher pressures may indicate a softer response (or softer ground force response) of the center actuator 902 to movement of the center frame 140 relative to the adapter frame 300. That is to say, the center actuator 902 may provide a biasing force to the agricultural harvesting head 104 away from the underlying surface.

Similarly, when the center frame sensor 916 is a position sensor, the values communicated to the controller 906 may indicate the position of the center frame 140 relative to the adapter frame 300. In other words, the center frame sensor 916 may be utilized by the controller 906 to identify a height 918 of the center frame 140 above an underlying surface. More specifically, in one non-exclusive embodiment the height of the adapter frame 300 above the underlying surface 920 may be substantially constant but the height 918 of the center frame 140 may vary based on the position of the center actuator 902.

Figure 10:
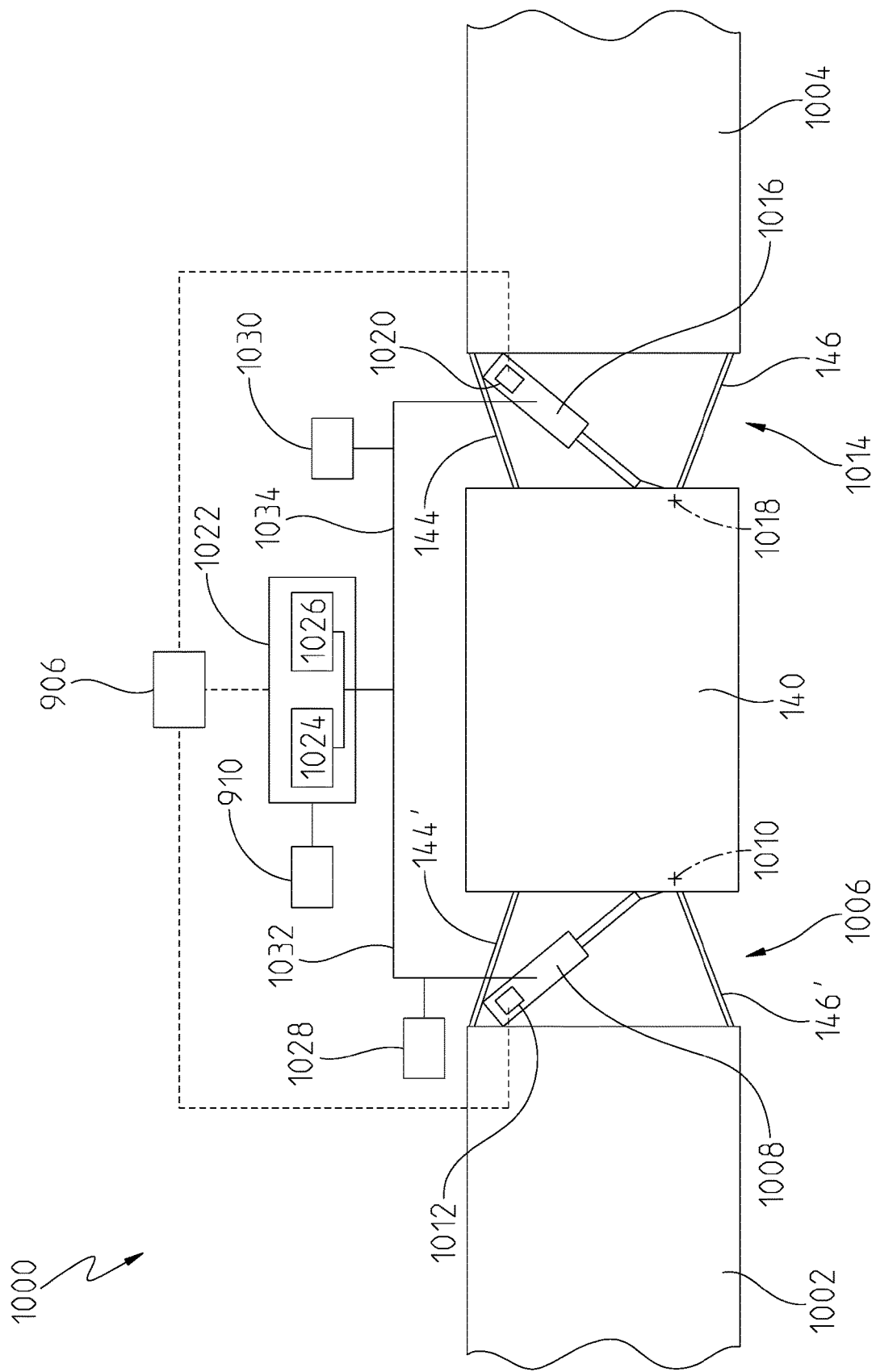
FIG. 10 is a schematic back view of the center frame of FIG. 9 coupled to a first and second frame arm assembly.

Referring now to FIG. 10, a schematic front view 1000 of the agricultural harvesting header 104 is illustrated. More specifically, the center frame 140 is illustrated pivotally coupled to a first arm assembly 1002 and a second arm assembly 1004. The first arm assembly 1002 may be comprised of the right frame section 142 and other portions associated therewith as discussed herein. The first arm assembly 1002 may be pivotally coupled to the center frame 140 via a first linkage assembly 1006. Further, the first linkage assembly 1006 may include the upper right link 144' and the lower right link 146' as discussed herein. However, any pivotal coupling assembly known in the art may be implemented for the first linkage assembly 1006. Further still, in one non-exclusive example the first arm assembly 1002 may be pivotally coupled directly to the center frame 140 without utilizing the first linkage assembly 1006 at all.

In one aspect of this disclosure, a first actuator 1008 may be coupled to the first arm assembly 1002 on one end and to the center frame 140 on the other end. Further, the first actuator 1008 may be repositionable to pivot the first arm assembly 1002 at least partially about a first arm axis 1010. A first arm sensor 1012 may also be positioned to identify a value indicating the relationship of the first arm assembly 1002 relative to the center frame 140. The first arm sensor 1012 may be a pressure sensor or a position sensor, among other types of sensors, similar to the center frame sensor 916.

In another aspect of this disclosure, the first actuator 1008 may not be coupled to the center frame 140 at all. Rather, in this embodiment the first actuator 1008 may be coupled to the first arm assembly 1002 or a linkage thereof on one end, and to the adapter frame 300 on the other. Alternatively, the first actuator 1008 may be coupled to any other portion of the agricultural harvester 100. A person skilled in the relevant art understands the many different locations wherein the first actuator 1008 may be coupled between the first arm assembly 1002 and other components of the agricultural harvester 100 to allow the first arm assembly 1002 to be pivotal relative to the center frame 140. Accordingly, this disclosure contemplates positioning the first actuator 1008 in any location that allows the first actuator 1008 to reposition the first arm assembly 1002 or provide different float force characteristics thereto.

Similarly, the second arm assembly 1004 may be comprised of the left frame section 138 and other portions associated therewith as discussed herein. The second arm assembly 1004 may be pivotally coupled to the center frame 140 via a second linkage assembly 1014. Further, the second linkage assembly 1014 may include the upper left link 144 and the lower left link 146 as discussed herein. However, any pivotal coupling assembly known in the art may be implemented for the second linkage assembly 1014. Further still, in one non-exclusive example the second arm assembly 1004 may be pivotally coupled directly to the center frame 140 without utilizing the second linkage assembly 1014 at all.

In one aspect of this disclosure, a second actuator 1016 may be coupled to the second arm assembly 1004 on one end and to the center frame 140 on the other end. Further, the second actuator 1016 may be repositionable to pivot the second arm assembly 1004 at least partially about a second arm axis 1018. A second arm sensor 1020 may also be positioned to identify a value indicating the relationship of the second arm assembly 1004 relative to the center frame 140. The second arm sensor 1020 may be a pressure sensor or a position sensor, among other types of sensors, similar to the center frame sensor 916. In another aspect of this disclosure, the second actuator 1016 may not be coupled to the center frame 140 at all. Rather, in this embodiment the second actuator 1016 may be coupled to the second arm assembly 1004 or a linkage thereof on one end, and to the adapter frame 300 on the other. Alternatively, the second actuator 1016 may be coupled to any other portion of the agricultural harvester 100. A person skilled in the relevant art understands the many different locations wherein the second actuator 1016 may be coupled between the second arm assembly 1004 and other components of the agricultural harvester 100 to allow the second arm assembly 1004 to be pivotal relative to the center frame 140. Accordingly, this disclosure contemplates positioning the second actuator 1016 in any location that allows the second actuator 1016 to reposition the second arm assembly 1004 or provide different float force characteristics thereto.

In one embodiment of FIG. 10, the first and second actuators 1008, 1016 are hydraulic actuators coupled to the hydraulic source 910, through a valve assembly 1022. The valve assembly 1022 may have a first valve 1024 that selectively controls the fluid pressure provided to the first actuator 1008 and a second valve 1026 that selectively controls the fluid pressure provided to the second actuator 1016. Each of the first and second valves 1024, 1026 may be variable valves controlled by the controller 906 to selectively fluidly couple the corresponding actuators 1008, 1016 to the hydraulic source 910 at a fluid pressure that corresponds with performance characteristics identified by the controller 906.

In one embodiment, accumulators 1028, 1030 may be fluidly coupled to fluid lines 1032, 1034 that fluidly couple the valves to the corresponding actuators 1008, 1016. The accumulators 1028, 1030 may be any known type of hydraulic accumulator that allows the corresponding actuators 1008, 1016 to springily support the corresponding arm assembly 1002, 1004. More specifically, while the controller 906 may alter the fluid pressure provided to the actuators 1008, 1016 with the valve assembly 1022 to raise or lower the corresponding arm assemblies 1002, 1004 relative to the center frame 140, the accumulators 1028, 1030 may allow the actuators 1008, 1016 to address force changes with a spring like response. In other words, if the actuators 1008, 1016 experiences an excessive compressive force, the fluid therein may be forced into an expanding fluid chamber of the accumulators 1028, 1030 similar to the accumulator 912.

In the example where the actuators 1008, 1016 are hydraulic or pneumatic actuators, the sensors 1012, 1020 may be pressure sensors fluidly coupled to the actuators 1008, 1016 or other portion of the fluid lines 1032, 1034 to identify a fluid pressure therein. Alternatively, in another example the sensors 1012, 1020 may be position sensors that identify the position of an actuator rod relative to an actuator cylinder. In other embodiments the sensors 1012, 1020 are position sensors coupled to a linkage or the like to identify the position of the corresponding arm assembly 1002, 1004 relative to the center frame 140. Further still, one embodiment considered herein includes both a position sensor and a pressure sensor as part of the sensors 1012, 1020.

Regardless of the type or location of the sensors 1012, 1020, the controller 906 may utilize the values identified by the sensors 1012, 1020 to indicate the performance characteristics of the of the corresponding arm assembly 1002, 1004 relative to the center frame 140. More specifically, if the sensors 1012, 1020 are pressure sensors, the values identified by the controller 906 may indicate the load on the corresponding arm assembly 1002, 1004 or the expected ground force response. Further still, higher pressures may indicate to the controller 906 that the corresponding arm assembly 1002, 1004 is at least partially raised relative to the underlying surface or will have a softer ground force response. In yet another embodiment, lower pressures may indicate a stiffer ground force response of the actuators 1008, 1016 when the corresponding arm assembly 1002, 1004 experiences a ground force input.

Similarly, when the sensor 1012, 1020 are position sensors, the values communicated to the controller 906 may indicate the position of the corresponding arm assembly 1002, 1004 relative to the center frame 140. In other words, the sensors 1012, 1020 may be utilized by the controller 906 to identify the orientation of the arm assemblies 1002, 1004 relative to the center frame 140. In this embodiment, both the height of the center frame 140 and the orientation of the arm assemblies 1002, 1004 may are monitored by the controller 906 to identify the cutting height of the reciprocating knife 128 among other things.

While FIG. 10 illustrates the first and second arm assemblies 1002, 1004 as being pivotally coupled to the center frame 140 via linkage assemblies 1006, 10014, in other embodiments considered herein the arm assembly 1002, 1004 may not be pivotally coupled to the center frame 140 at all. For example, in one non-exclusive embodiment the arm assemblies 1002, 1004 may be pivotally coupled to the adapter frame 300 instead to the center frame 140. Accordingly, this disclosure contemplates implementing the teachings discussed herein regardless of the particular locations with which the components 110, 140, 300, 1002, 1004 are coupled to one another.

Figure 11:
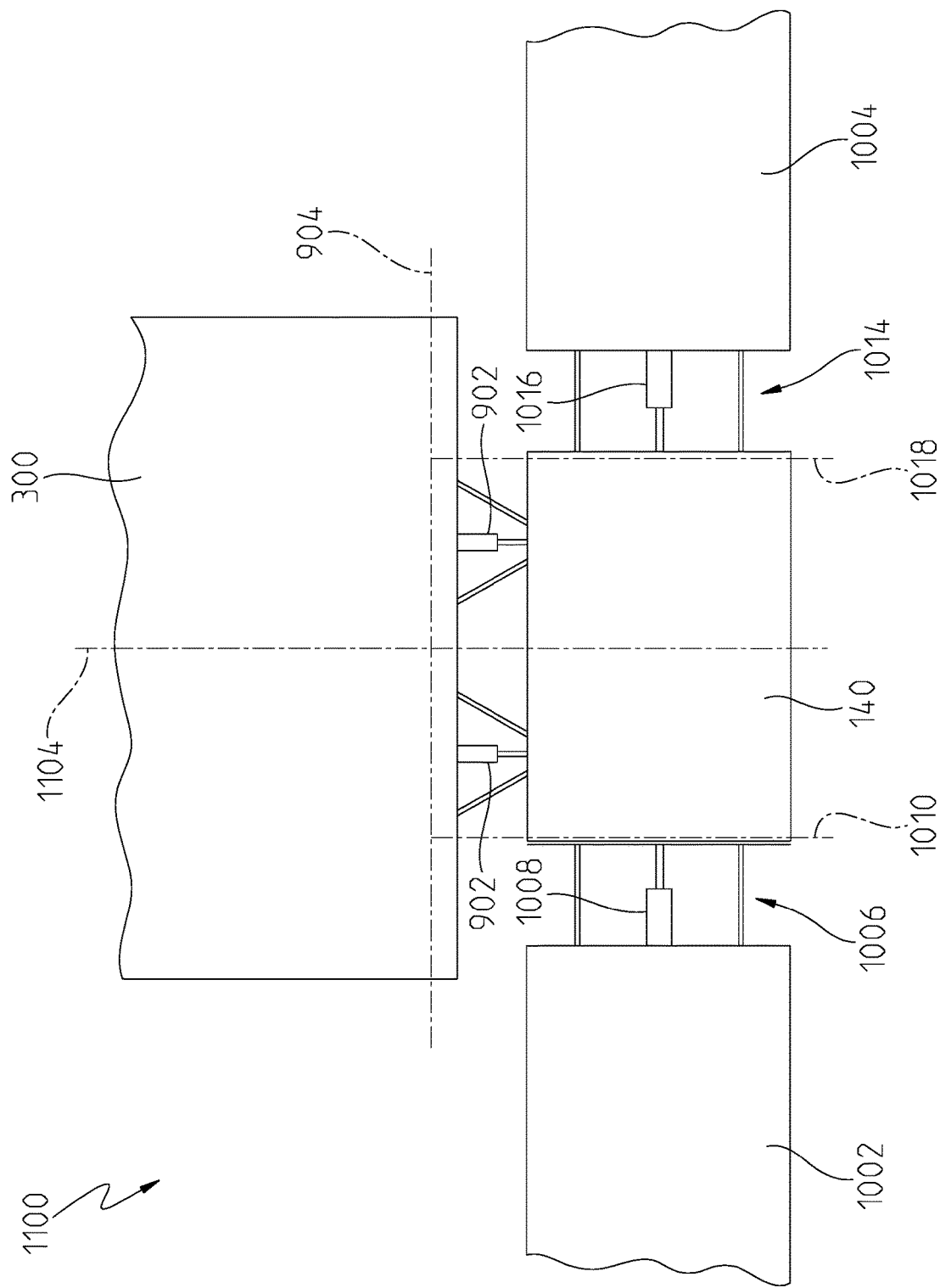
FIG. 11 is a schematic top view of the center frame and arm assemblies of FIG. 10.

Referring now to FIG. 11, a top view of a schematic representation 1100 of the adapter frame 300, the center frame 140, and the arm assemblies 1002, 1004 is illustrated. More specifically, the relationship of the center axis 904 relative to the first and second arm axes 1010, 1018 is illustrated. As can be seen in FIG. 11, the first and second arm axes 1010, 1018 are about ninety degrees offset from the center axis 904. In this configuration, the center actuator 902 alters the height of the center frame 140 by pivoting partially about the center axis 904. Further, the center axis 904 may extend transverse to a longitudinal axis 1104 which extends along the general direction of travel of the agricultural harvester 100.

While the center frame 140 is described as pivoting partially about the center axis 904, in one aspect of this disclosure the center frame 140 is pivotally coupled to the adapter frame 300 via a four-bar linkage as shown and described herein. Accordingly, the center axis 904 may be defined through the pivoting coupling point of the lower links 306, 308 to the adapter frame 300. Similarly, the arm assemblies 1002, 1004 may be coupled to the center frame via one or more linkage. In one non-exclusive example, the first arm axis 1010 is defined through the pivotal coupling point of the lower link 146' to the center frame 140 and the second arm axis 1018 is defined through the pivotal coupling point of the lower link 146 to the center frame 140.

Further still, while the first and second arm axis 1010, 1018 are discussed herein as being about ninety degrees offset from the center axis 904, in one embodiment the first and second arm axis 1010, 1018 may be offset slightly less or more than ninety degrees from the center axis 904. However, when the center frame 140 rotates at least partially about the center axis 904, the orientation of both the first and second arm assemblies 1002, 1004 is affected since both the first and second arm assemblies 1002, 1004 are pivotally coupled to the center frame 140. Accordingly, as discussed herein, often adjusting the orientation of the center frame 140 relative to the adapter frame 300 also requires adjustments to the first and second arm assemblies 1002, 1004 as well.

Figure 12:
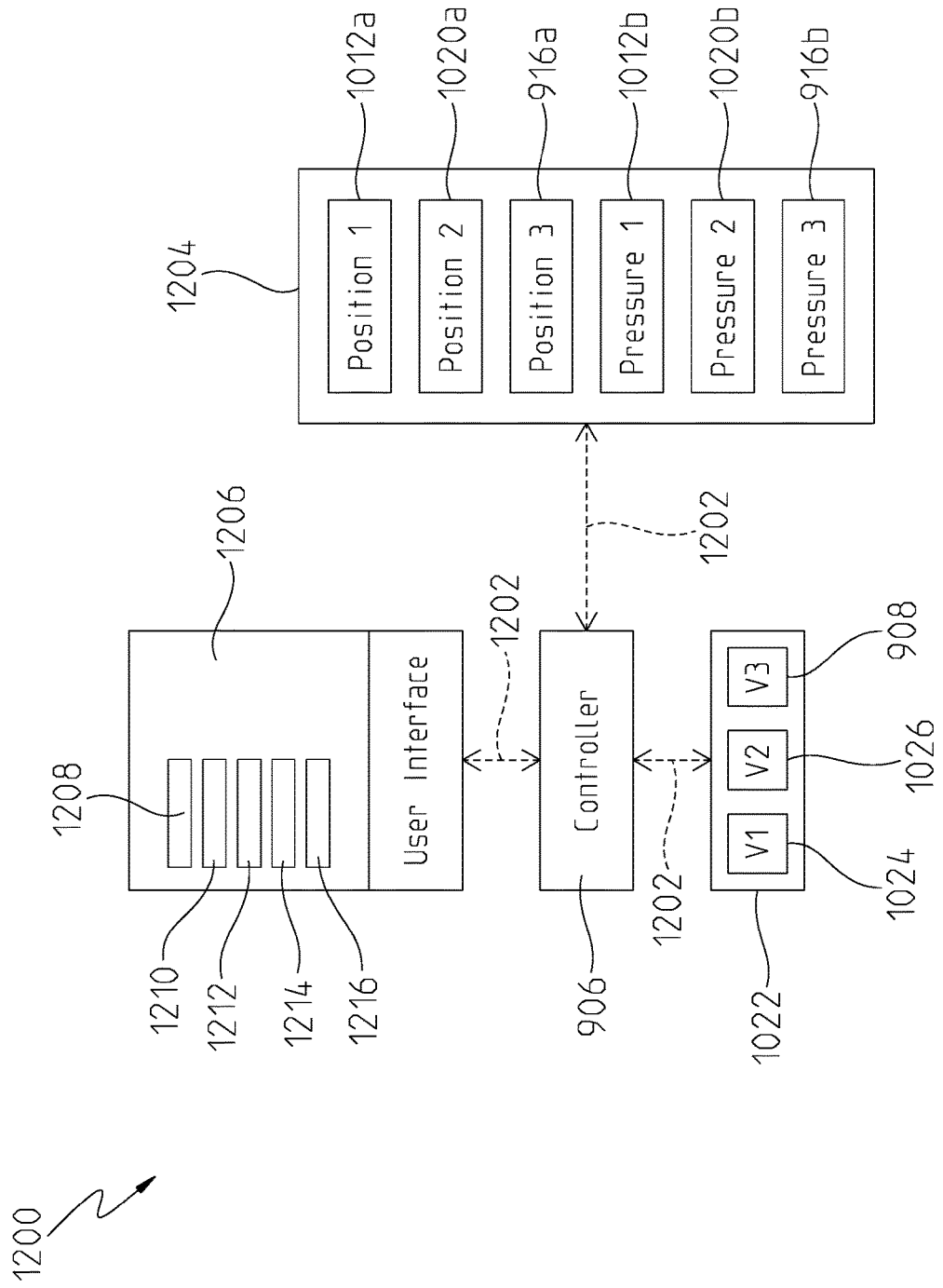
FIG. 12 is a schematic view of one embodiment of an electrical system.

Referring now to FIG. 12, a schematic view 1200 of some of the electrical components is illustrated. More specifically, the controller 906 is illustrated in communication with several electrical systems of the agricultural harvesting machine. While only one controller 906 is illustrated, this disclosure contemplates implementing the logic discussed herein utilizing multiple controllers as well. The controller 906 may have a processor and a memory unit among other components that enable the controller 906 to process information and implement algorithms, programmed responses, logic, and the like. Further, the controller 906 may be located on the agricultural harvester 100 or remotely therefrom and communicate wirelessly with the agricultural harvester 100 utilizing known wireless communication protocols.

In one aspect of this disclosure, the controller 906 communicates with the valve assembly 1022 to at least partially control the center actuator 902, first actuator 1008, and second actuator 1016 among other things. The valve assembly 1022 may be a valve block that has the first valve 1024, second valve 1026, and center valve 908 coupled to one another. Alternatively, each of the first valve 1024, second valve 1026, and center valve 908 can be located separate from one another. The controller 906 may communicate with each valve 1024, 1026, 908 of the of the valve assembly 1022 via a communication protocol 1202. The communication protocol 1202 may be electrical signals sent though a wire harness electrically coupling the valve assembly 1022 to the controller 906. Alternatively, the communication protocol 1202 may also be wireless signals that allow the controller 906 and valve assembly 1022 to communicate with one another using known wireless capabilities.

Each valve 1024, 1026, 908 of the of the valve assembly 1022 may be a variable valve capable of varying the flow rate, pressure, or the like provided to the corresponding actuator 1008, 1016, 902. In this example, the controller 906 may send signals to the valve assembly 1022 indicating the desired flow rate and pressure to be provided through the corresponding valve 1024, 1026, 908 to thereby alter the position and response characteristics of the agricultural harvesting head 104.

Similarly, the controller 906 may communicate with a sensor assembly 1204 via a communication protocol 1202. The sensor assembly 1204 may include any known type of sensor they may identify conditions of the agricultural head 104 among other things. In the non-exclusive example of FIG. 12, the sensor assembly 1204 may include the first arm assembly sensor 1012 which may be a position sensor 1012*a* and a pressure sensor 1012*b* that indicate the position of the first arm assembly 1002 relative to the center frame 140 and the fluid pressure provided to the first actuator 1008. The sensor assembly 1204 may also include the second arm assembly sensor 1020 which may be a position sensor 1020*a* and a pressure sensor 1020*b* that indicate the position of the second arm assembly 1004 relative to the center frame 140 and the fluid pressure provided to the second actuator 1016. Further still, the sensor assembly 1204 may also include the center frame sensor 916 which may be a position sensor 916*a* and a pressure sensor 916*b* that indicate the position of the center frame 140 relative to the adapter frame 300 and the fluid pressure provided to the center actuator 902.

While several specific types of sensors are discussed herein for the sensor assembly 1204, this disclosure contemplates utilizing any type of sensor known in the art to communicate values to the controller 906. Accordingly, the sensors discussed herein are meant only as some non-exclusive examples considered for this disclosure.

The controller 906 may also communicate with a user interface 1206 via a communication protocol 1202. The user interface 1206 may be any type of user interface that allows a user to indicate a preference to the controller 906. More specifically, the user interface 1206 may be a touchscreen or the like positioned within a cab of the agricultural combine 102. The touch screen may be capable of displaying many icons thereon and identifying to the controller 906 when one of the displayed icons is selected by the user. In one non-exclusive example, the user interface 1206 may have at least five icons or options that may be selected by the user. Option1 1208 may correspond with a very firm configuration, Option2 1210 may correspond with a firm configuration, Option3 1212 may correspond with a typical configuration, Option4 1214 may correspond with a soft configuration, and Option5 1216 may correspond with a very soft configuration.

While the user interface 1206 is described as being a touchscreen, this disclosure contemplates any known type of user interface 1206. More specifically, in another embodiment, each of the options 1208, 1210, 1212, 1214, 1216 may be a toggle switch or button that is selectable from within the cab. Alternatively, the user interface 1206 can be voice commands wherein the user verbally expresses the desired option. Further still, in one embodiment, the user interface is displayed on a remote device such as a laptop, tablet, smartphone, or the like. Accordingly, this disclosure contemplates utilizing many different forms for a user interface 1206.

Figure 13:
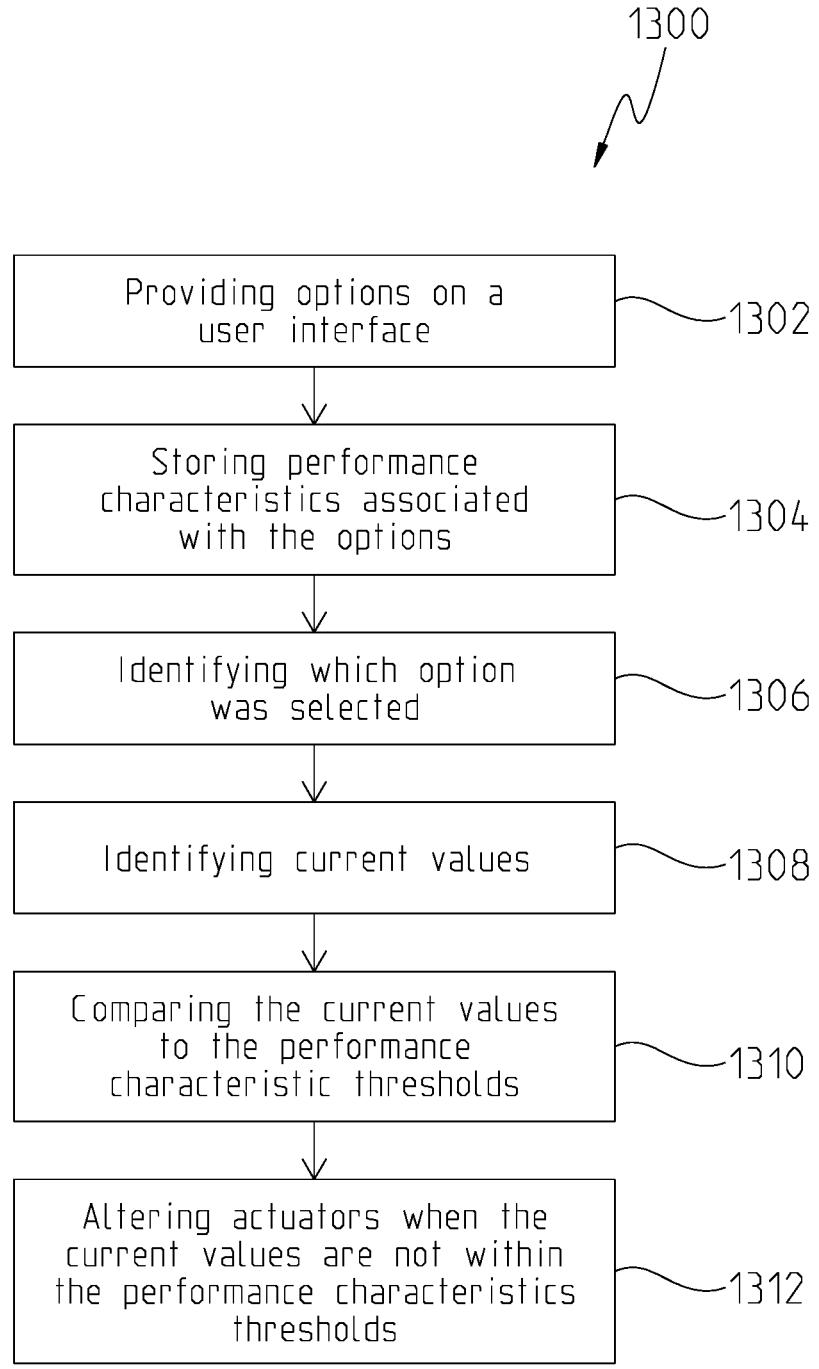
FIG. 13 is one embodiment of a logic flow chart.

Referring now to FIG. 13, a logic flow chart 1300 of one embodiment of this disclosure is illustrated. Initially in box 1302, the options 1208, 1210, 1212, 1214, 1216 for the user interface 1206 may be provided. As discussed herein, the way the options are provided may depend on the type of user interface 1206 being implemented. If the user interface 1206 is a touchscreen display, the options may be provided as icons on the touchscreen display. Alternatively, the options may be provided by switches or buttons in the cab. Further still, the options may be provided audibly to incite a verbal response.

In box 1304, the controller 906 may associate performance characteristics with each of the options 1208, 1210, 1212, 1214, 1216 provided on the user interface 1206. The performance characteristics may be threshold values associated with the fluid pressure provided to each actuator 902, 1008, 1016, position thresholds of the arm assemblies 1002, 1004 relative to the center frame 140 and the center frame 140 relative to the adapter frame 300, or any combination thereof. The performance characteristics associated with each option may be stored in a memory unit or the like that the controller 906 may access as needed. In one embodiment the performance characteristics are identified by the controller 906 with reference to a graph of float curves. In this embodiment, the float curves may be predefined values that have been established from field testing or virtual performance data to indicate the desired performance characteristics that should be associated with each option.

In box 1306, the controller 906 identifies which option was selected via the user interface 1206. The user interface 1206 may send signals to the controller 906 through the communication protocol 1202 indicating the option selected by the user.

In box 1308, the controller 906 may identify the current values of the sensor assembly 1204. The current values may include the current fluid pressure being applied to each actuator 902, 1008, 1016, the position of the components 300, 140, 1002, 1004 relative to one another, or any combination thereof among other things. Next, in box 1310, the controller 906 may compare the current values identified in box 1308 with the performance characteristics of the option selected in box 1306. This portion may involve determining whether the center frame sensor 916 is identifying a pressure that is within a center frame pressure threshold range of the selected performance characteristics, whether the first arm assembly sensor 1012 is identifying a pressure that is within a first arm assembly pressure threshold range of the selected performance characteristics, and whether the second arm assembly sensor 1020 is identifying a pressure that is within a second arm assembly pressure threshold range of the selected performance characteristics among other things. Additionally, the position of the components 300, 140, 1002, 1004 may be compared to expected position thresholds in box 1310 as well.

In box 1312, the controller 906 may utilize the valve assembly 1022 to alter any of the actuators 902, 1008, 1016 that were not within the performance characteristics thresholds identified in box 1310. More specifically, if the center frame sensor 916 is indicating values that are not within the performance characteristics associated with the selected option, the controller 906 may alter the center valve 908 until the center frame sensor 916 indicates a value within the performance characteristics of the selected option. The controller 906 may implement a similar procedure for the first and second actuators 1008, 1016 to ensure all of the performance characteristic values are met by all of the actuators 902, 1008, 1016. In one aspect of this disclosure, the controller 906 may continue to compare the values of the sensor assembly 1204 to the performance characteristics to ensure that the sensor values remain within thresholds for the selected option.

In one aspect of this disclosure, a user may utilize the user interface 1206 to select a desired option therefrom. In one non-exclusive example, the options 1208, 1210, 1212, 1214, 1216 may refer to a float response of the agricultural harvesting header 104. In other words, each option may provide different float responses for the agricultural harvesting header 104. If the user selects Option1 1208, the controller 906 identifies that the user desires a very firm float response of the agricultural harvesting header 104 and identifies the performance characteristics associated therewith (such as desired fluid pressure thresholds for the actuators 902, 1008, 1016). The very firm Option1 1208 may have relatively low pressure value thresholds associated therewith as part of the performance characteristics for Option1 1208. The controller 906 may then utilize the valve assembly 1022 and the sensor assembly 1204 to independently adjust the fluid pressure provided to each of the actuators 902, 1008, 1016 until the current fluid pressure identified by the controller 906 for each actuator 902, 1008, 1016 is within the pressure thresholds of Option1 1208. The controller 906 may then utilize the valve assembly 1022 and sensor assembly 1204 to maintain the pressure values within the pressure threshold values of the performance characteristics for that option.

Alternatively, if the user selects Option5 1216, the controller 906 identifies that the user desires a very soft float response of the agricultural harvesting header 104 and identifies the performance characteristics associated therewith (such as desired fluid pressure thresholds for the actuators 902, 1008, 1016). The very soft Option5 1216 may have relatively high pressure value thresholds (compared to Option1 1208) associated therewith as part of the performance characteristics for Option5 1216. The controller 906 may then utilize the valve assembly 1022 and the sensor assembly 1204 to adjust the fluid pressure provided to the actuators 902, 1008, 1016 until the current fluid pressure identified by the controller is within the pressure thresholds of Option5 1216. The controller 906 may then utilize the valve assembly 1022 and sensor assembly 1204 to maintain the pressure values within the pressure threshold values of the performance characteristics for that option.

In another embodiment, the options may correspond with desired cutting heights. In this example, Option1 1208 may correspond with performance characteristics that allow a very tall cutting height. When the controller 906 identifies Option1 1208 is selected, the controller 906 may utilize the sensor assembly 1204 to identify the position of the corresponding components 140, 300, 1002, 1004 relative to one another. Further, the controller 906 may have stored therein as the performance characteristics for Option1 1208 position sensor values that correspond with the a very tall cutting height. The controller 906 may then monitor the sensor assembly 1204 and manipulate the valve assembly 1022 to alter the actuators 902, 1008, 1016 until the sensor value readings of the sensor assembly 1204 are within the position thresholds for Option1, 1208. A similar methodology can be implemented for any number of cutting heights for the remaining options.

As discussed herein, the user may select one option from the user interface 1206 and the controller 906 may adjust all of the actuators of the agricultural harvesting head 104 substantially simultaneously. That is to say, the controller 906 manipulates the center actuator 902 to adjust the center frame 140 while simultaneously adjusting the first and second actuators 1008, 1016 to alter the corresponding arm assemblies 1002, 1004 as well. Further, the performance characteristics stored in the controller 906 correspond with the desired final position/response characteristics of the center frame 130, first arm assembly 1002, and second arm assembly 1004 such that the performance characteristics account for the position of the adjacent component. For example, if the center frame 140 is raised from the underlying surface, the position and pressures of the first and second arm assemblies 1002, 1004 may be different than when the center frame 140 is traveling along the underlying surface. Accordingly, each of the options 1208, 1210, 1212, 1214, 1216 have performance characteristics associated therewith that consider the orientation of several other components of the agricultural harvesting head 104.

In the discussion above, various components and axes are described as extending in a fore-and-aft direction, or extending in a direction parallel to a direction of travel "V", or extending horizontally or longitudinally, or extending laterally. During normal operation, these components are expected to move. Typically, they can be pivoted or tilted with respect to each other, with respect to the ground, or with respect to the combine during normal operation and therefore are not precisely horizontal, vertical, longitudinally extending or laterally extending in all positions during operation.

Although the disclosure is illustrated as being used one type of combine, the present disclosure can be used on other combine types including conventional straw walker combines and hybrid combines having transverse threshing cylinders and rotary separators among other work machine types altogether.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A system for a header assembly, comprising:
a center frame configured to pivot relative to an adapter frame about at least one center axis;
a center actuator coupled to the center frame to selectively provide a biasing force thereto;
a first arm assembly configured to pivot relative to the center frame about at least a first arm axis;
a first actuator coupled to the first arm assembly to selectively provide a biasing force thereto;
a controller in communication with the center actuator and the first actuator to selectively alter performance characteristics of both of the center actuator and the first actuator substantially simultaneously, wherein the performance characteristics include a float response based on a float response threshold range of values for each of the center actuator and the first actuator or a cutting height based on a cutting height threshold range of values for each of the center actuator and the first actuator; and
a user interface in communication with the controller and having at least a first option to select a first performance characteristic including a first float response threshold range of values for each of the center actuator and the first actuator and a second option to select a second performance characteristic including a second float response threshold range of values for each of the center actuator and the first actuator;
wherein, the controller adjusts the first and second performance characteristics of both the center actuator and the first actuator substantially simultaneously when the user interface is transitioned between the first option and the second option.

2. The system of claim 1, further wherein the center actuator is a hydraulic actuator fluidly coupled to an accumulator, wherein the performance characteristic of the float response altered by the controller is the hydraulic pressure provided to the hydraulic actuator.

3. The system of claim 1, further wherein the first actuator is a first hydraulic actuator fluidly coupled to an accumulator, wherein the performance characteristic of the float response altered by the controller is the hydraulic pressure provided to the first hydraulic actuator.

4. The system of claim 1, further wherein the center actuator is a center hydraulic actuator and the first actuator is a first hydraulic actuator, wherein the performance characteristic of the float response altered by the controller includes hydraulic pressure provided to the center hydraulic actuator and the first hydraulic actuator.

5. The system of claim 4, further comprising a center valve fluidly coupled to the center hydraulic actuator and a first valve fluidly coupled to the first hydraulic actuator, wherein the controller communicates with both the center valve and the first valve to selectively provide hydraulic fluid to the corresponding hydraulic actuator at the hydraulic pressure identified by the performance characteristic.

6. The system of claim 4, further wherein the hydraulic pressure provided to the center hydraulic actuator is different from the hydraulic pressure provided to the first hydraulic actuator.

7. The system of claim 1, further wherein the user interface has a third option, a fourth option, and a fifth option, wherein each of the options corresponds with different performance characteristics identified respectively as a third, a fourth, and a fifth float response threshold range of values for each of the center actuator and the first actuator.

8. The system of claim 1, further comprising:
a second arm assembly configured to pivot relative to the center frame about at least a second arm axis;
a second actuator coupled to the second arm assembly to selectively provide a biasing force thereto;
wherein, the controller is in communication with the second actuator to selectively alter performance characteristics of the second actuator;
further wherein, the controller adjusts the performance characteristics of the second actuator substantially simultaneously with the adjusting of the first and second performance characteristics of both the center actuator and the first actuator when the user interface is transitioned between the first option and the second option.

9. The system of claim 1, further wherein the center axis and the first arm axis are about ninety degrees offset from one another.

10. The system of claim 1, further comprising:
a first arm assembly sensor that identifies an arm position relative to the center frame; and
a center frame sensor that identifies a center frame position relative to the adapter frame.

11. The system of claim 10, further wherein the performance characteristics include cutting height threshold position ranges for the arm position and the center frame position and the controller repositions the first actuator and the center actuator to position the corresponding center frame and first arm assembly into the cutting height threshold position ranges.

12. A system for adjusting a header assembly of a combine, comprising:
a center frame pivotally coupled to an adapter frame about at least one center axis;
a center actuator configured to reposition the center frame;
a first arm assembly configured to be pivotal relative to the center frame about at least a first arm axis;
a first actuator configured to reposition the first arm assembly;
a second arm assembly configured to be pivotal relative to the center frame about at least a second arm axis;
a second actuator configured to reposition the second arm assembly;
a controller in communication with the center actuator, the first actuator, and the second actuator to selectively alter performance characteristics, wherein the performance characteristics include a float response based on a float response threshold range of values for each of the center actuator, the first actuator, and the second actuator, or a cutting height based on a cutting height threshold range of values for each of the center actuator, first actuator, and second actuator; and
a user interface in communication with the controller and having at least a first option to select a performance characteristic based on a first float response threshold range of values for each of the center actuator, the first actuator, and the second actuator, or a first cutting height threshold range of values for each of the center actuator, the first actuator, and the second actuator, and a second option to select a performance characteristic based on a second float response threshold range of values for each of the center actuator, the first actuator, and the second actuator, or a second cutting height threshold range of values for each of the center actuator, the first actuator, and the second actuator;
wherein, the controller adjusts the performance characteristics of at least one of the center actuator, the first actuator, and the second actuator when the user interface is transitioned between the first option and the second option.

13. The system of claim 12, further wherein each of the center actuator, the first actuator, and the second actuator are hydraulic actuators, wherein the performance characteristic of the float response altered by the controller is the hydraulic pressure provided to at least one of the center actuator, the first actuator, and the second actuator.

14. The system of claim 13, further comprising at least one accumulator fluidly coupled to at least one of the center actuator, the first actuator, and the second actuator.

15. The system of claim 13, further wherein the performance characteristics altered by the controller is the hydraulic pressure provided to each of the center actuator, the first actuator, and the second actuator.

16. The system of claim 13, further comprising valve assembly that selectively provides hydraulic fluid to each of the center actuator, the first actuator, and the second actuator from a hydraulic source, wherein the controller communicates with the valve assembly to selectively provide hydraulic fluid to each of the center actuator, the first actuator, and the second actuator at a hydraulic pressure identified by the performance characteristics associated with the selected option.

17. The system of claim 12, further wherein the first arm axis and the second arm axis are about ninety degrees offset from the center axis.

18. A method for adjusting a header assembly of a combine, comprising:
providing a center frame pivotally coupled to an adapter frame about at least one center axis, an center actuator coupled to the center frame, a first arm assembly pivotally coupled to the center frame about at least a first arm axis, a first actuator coupled to the first arm assembly, a second arm assembly pivotally coupled to the center frame about at least a second arm axis, a second actuator coupled to the second arm assembly, a controller in communication with the center actuator, the first actuator, and the second actuator, a user interface, and a sensor assembly;
providing, with the user interface, at least a first option and a second option that is selectable by a user;
storing, in the controller, a first set of performance characteristic thresholds associated with the first option and a second set of performance characteristic thresholds associated with the second option;
identifying, with the user interface, when the first option or the second option are selected;
identifying current values for the center frame, first frame assembly, and second frame assembly with the sensor assembly and communicating the current values to the controller;
comparing the current values with the performance characteristic thresholds associated with the selected first option or second option;
altering a corresponding one or more of the center actuator, the first actuator, and the second actuator with the controller when the current values are not within the performance characteristics thresholds of the selected first or second option.

19. The method of claim 18, further wherein the center actuator, the first actuator, and the second actuator are hydraulic actuators and the first set of performance characteristic thresholds and the second set of performance characteristic thresholds are hydraulic pressure thresholds that correspond with each of the center actuator, the first actuator, and the second actuator.

20. The method of claim 18, further wherein the first and second set of performance characteristic thresholds are determined by the controller with reference to a float curve chart.

* * * * *